United States Patent
Seo et al.

(10) Patent No.: US 10,264,442 B2
(45) Date of Patent: Apr. 16, 2019

(54) METHOD FOR TRANSMITTING OR RECEIVING A SIGNAL IN A WIRELESS COMMUNICATION SYSTEM AND APPARATUS FOR THE SAME

(71) Applicant: LG ELECTRONICS INC., Seoul (KR)

(72) Inventors: Inkwon Seo, Seoul (KR); Hyungtae Kim, Seoul (KR); Myoungseob Kim, Seoul (KR); Haewook Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 112 days.

(21) Appl. No.: 15/374,359

(22) Filed: Dec. 9, 2016

(65) Prior Publication Data
US 2017/0171899 A1    Jun. 15, 2017

Related U.S. Application Data

(60) Provisional application No. 62/265,954, filed on Dec. 10, 2015.

(51) Int. Cl.
| | |
|---|---|
| *H04W 8/22* | (2009.01) |
| *H04B 7/0413* | (2017.01) |
| *H04W 28/08* | (2009.01) |
| *H04W 76/14* | (2018.01) |
| *H04W 88/04* | (2009.01) |
| *H04W 8/26* | (2009.01) |

(52) U.S. Cl.
CPC ............ *H04W 8/22* (2013.01); *H04B 7/0413* (2013.01); *H04W 28/08* (2013.01); *H04W 76/14* (2018.02); *H04W 88/04* (2013.01); *H04W 8/26* (2013.01)

(58) Field of Classification Search
None
See application file for complete search history.

(56) References Cited

U.S. PATENT DOCUMENTS

| | | | | |
|---|---|---|---|---|
| 2014/0105096 A1* | 4/2014 | Wang | .................... | H04L 12/189 370/312 |
| 2015/0230224 A1* | 8/2015 | Maaref | .................... | H04W 4/08 455/451 |
| 2015/0312923 A1* | 10/2015 | Guo | .................... | H04W 72/121 370/329 |
| 2016/0227463 A1* | 8/2016 | Baligh | .................. | H04W 40/02 |

* cited by examiner

*Primary Examiner* — Saumit Shah
(74) *Attorney, Agent, or Firm* — Birch, Stewart, Kolasch & Birch, LLP

(57) ABSTRACT

A method for transmitting a downlink signal by a base station in a wireless communication system comprises transmitting at least a part of downlink data to a first user equipment (UE); and transmitting the other part of the downlink data of the first UE to a second UE that is paired with with the first UE when a size of the downlink data of the first UE exceeds a data reception capability of the first UE, wherein transmission for the first UE and transmission for the second UE are performed at the same time, and the other part of the downlink data of the first UE, which are transmitted to the second UE, may be shared with the first UE through direct communication between the first UE and the second UE.

14 Claims, 13 Drawing Sheets

-- Prior Art. --

(a) CONTROL-PLANE PROTOCOL STACK (b) USER-PLANE PROTOCOL STACK (a) in coverage    (b) out-of-coverage    (c) partial coverage

METHOD FOR TRANSMITTING OR RECEIVING A SIGNAL IN A WIRELESS COMMUNICATION SYSTEM AND APPARATUS FOR THE SAME

CROSS REFERENCE TO RELATED APPLICATIONS

This application claims the benefit of U.S. Provisional Application No. 62/265,954 filed on Dec. 10, 2015, which is hereby incorporated in its entirety by reference as if fully set forth herein.

BACKGROUND OF THE INVENTION

Field of the Invention

The present invention relates to a wireless communication system, and more particularly, to a method for transmitting or receiving a downlink signal in a wireless communication system that supports MIMO and an apparatus for the same.

Discussion of the Related Art

As an example of a mobile communication system to which the present invention is applicable, a 3rd generation partnership project long term evolution (hereinafter, referred to as LTE) communication system is described in brief.

FIG. 1 is a diagram schematically illustrating a network structure of an E-UMTS as an exemplary radio communication system. An evolved universal mobile telecommunications system (E-UMTS) is an advanced version of a legacy universal mobile telecommunications system (UMTS) and basic standardization thereof is currently underway in 3GPP. E-UMTS may be generally referred to as an LTE system. For details of the technical specifications of UMTS and E-UMTS, reference can be made to Release 7 and Release 8 of "3rd Generation Partnership Project; Technical Specification Group Radio Access Network".

Referring to FIG. 1, the E-UMTS includes a user equipment (UE), evolved Node Bs (eNode Bs or eNBs), and an access gateway (AG) which is located at an end of an evolved UMTS terrestrial radio access network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.25, 2.5, 5, 10, 15, and 20 MHz to provide a downlink or uplink transmission service to multiple UEs. Different cells may be configured to provide different bandwidths. The eNB controls data transmission and reception to and from a plurality of UEs. Regarding downlink (DL) data, the eNB transmits DL scheduling information to notify a corresponding UE of a time/frequency domain within which data is to be transmitted, coding, data size, and hybrid automatic repeat request (HARQ)-related information by transmitting DL scheduling information to the UE. In addition, regarding uplink (UL) data, the eNB transmits UL scheduling information to a corresponding UE to inform the UE of an available time/frequency domain, coding, data size, and HARQ-related information. An interface for transmitting user traffic or control traffic between eNBs may be used. A core network (CN) may include the AG and a network node for user registration of the UE. The AG manages mobility of a UE on a tracking area (TA) basis, each TA including a plurality of cells.

Although radio communication technology has been developed up to LTE based on wideband code division multiple access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, a simplified structure, an open interface, appropriate power consumption of a UE, etc. are required.

SUMMARY OF THE INVENTION

Accordingly, the present invention is directed to a method for transmitting or receiving a signal in a wireless communication system and an apparatus for the same, which substantially obviate one or more problems due to limitations and disadvantages of the related art.

An object of the present invention is to provide a method for more efficiently transmitting or receiving a downlink signal having a great size by solving a restriction caused by a receiving antenna of a UE in a wireless communication system that supports MIMO and an apparatus for the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one aspect of the present invention, a method for transmitting a downlink signal by a base station in a wireless communication system comprises transmitting at least a part of downlink data to a first user equipment (UE); and transmitting the other part of the downlink data of the first UE to a second UE that is paired with with the first UE when a size of the downlink data of the first UE exceeds a data reception capability of the first UE, wherein transmission for the first UE and transmission for the second UE are performed at the same time, and the other part of the downlink data of the first UE, which has been transmitted to the second UE, may be shared with the first UE through direct communication between the first UE and the second UE.

In another aspect of the present invention, a base station for transmitting a downlink signal in a wireless communication system comprises a transmitter for transmitting at least a part of downlink data to a first user equipment (UE); and a processor for controlling the transmitter to transmit the other part of the downlink data of the first UE to a second UE that is paired with with the first UE when a size of the downlink data of the first UE exceeds a data reception capability of the first UE, wherein transmission for the first UE and transmission for the second UE are performed at the same time, and the other part of the downlink data of the first UE, which has been transmitted to the second UE, may be shared with the first UE through direct communication between the first UE and the second UE.

Also, the base station may transmit, to the first UE, information on relation between at least a part of the downlink data transmitted to the first UE and the other part of the downlink data of the first UE transmitted to the second UE. The information on relation may include a segment unit of the downlink data of the first UE and an index of each segment data transmitted to each of the first UE and the second UE.

Also, the base station may allocate, to the first UE or the second UE, a time resource for performing the direct communication between the first UE and the second UE.

Also, the base station may request the first UE to measure neighboring UEs for selecting the second UE if the size of the downlink data of the first UE exceeds a data reception capability of the first UE, and may receive, from the first UE, a measurement report that includes at least one of ID of the second UE selected from the neighboring UEs and preference of the first UE for the second UE.

Also, the data reception capability of the first UE may be determined based on the number of receiving antennas of the first UE.

In other aspect of the present invention, a method for receiving a downlink signal in a first user equipment (UE) in a wireless communication system comprises reporting information on a second UE that is paired with with the first UE to a base station when a size of downlink data to be received by the first UE exceeds a data reception capability of the first UE; receiving at least a part of the downlink data of the first UE from the base station; receiving the other part of the downlink data of the first UE from the second UE through direct communication between the first UE and the second UE; and merging the at least a part of the downlink data received from the base station with the other part of the downlink data received from the second UE.

Also, the first UE may receive, from the base station, information on relation between the at least a part of the downlink data transmitted to the first UE and the other part of the downlink data of the first UE transmitted to the second UE. The information on relation may include a segment unit of the downlink data of the first UE and an index of segment data transmitted to each of the first UE and the second UE.

Also, the first UE may be allocated with a time resource for performing the direct communication between the first UE and the second UE from the base station.

Also, the first UE may measure neighboring UEs for selecting the second UE if the size of the downlink data of the first UE exceeds a data reception capability of the first UE and transmit a measurement report that includes at least one of ID of the second UE selected from the neighboring UEs and preference of the first UE for the second UE to the base station.

Also, the data reception capability of the first UE may be determined based on the number of receiving antennas of the first UE.

Also, transmission of the base station for the first UE and transmission of the base station for the second UE may be performed at the same time.

According to one embodiment of the present invention, the number of UEs or the number of receiving antennas, which receive data through cooperation between UEs in a wireless communication system supporting MIMO, is increased, whereby throughput restriction caused by the number of receiving antennas can be solved, and a downlink signal having a great size can be transmitted or received more efficiently.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Hereinafter, structures, operations, and other features of the present invention will be readily understood from the embodiments of the present invention, examples of which are illustrated in the accompanying drawings. Embodiments which will be described hereinbelow are examples in which technical features of the present invention are applied to a 3GPP system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition. In addition, although the embodiments of the present invention will be described based on frequency division duplexing (FDD), the FDD mode is purely exemplary and the embodiments of the present invention can easily be applied to half-FDD (H-FDD) or time division duplexing (TDD) with some modifications. In the present disclosure, a base station (eNB) may be used as a broad meaning including a remote radio head (RRH), an eNB, a transmission point (TP), a reception point (RP), a relay, etc.

Figure 1:
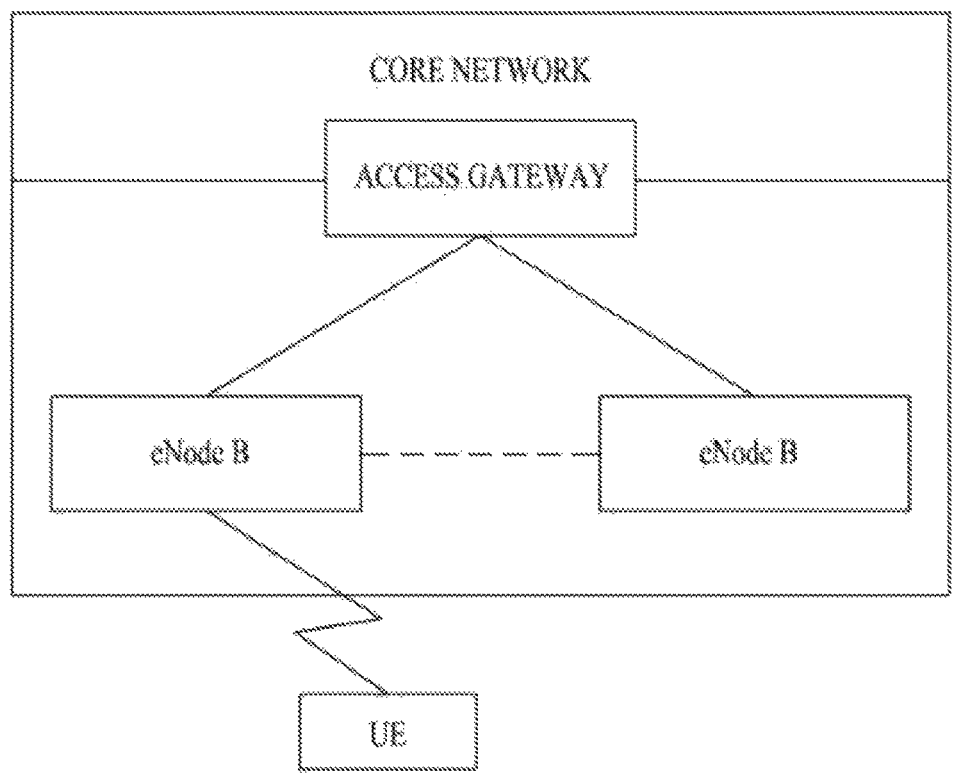
FIG. 1 is a diagram schematically illustrating a network structure of an E-UMTS as an exemplary radio communication system.
Figure 2:
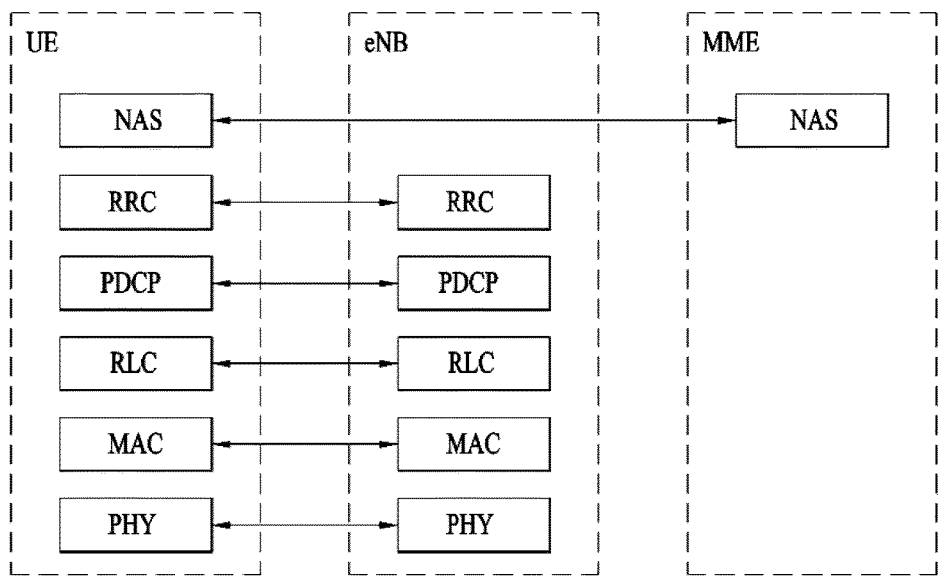
FIG. 2 is a diagram illustrating structures of a control plane and a user plane of a radio interface protocol between a UE and an E-UTRAN based on the 3GPP radio access network specification.
Figure 2:
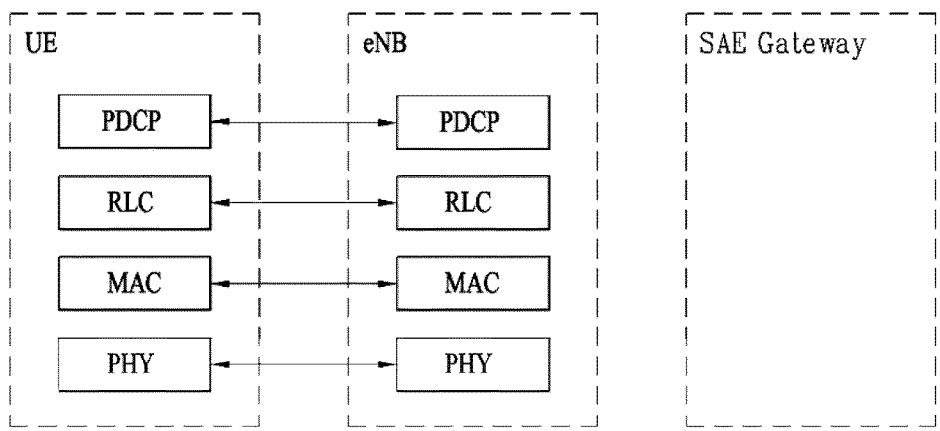

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel. Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

A cell constituting an eNB is set to one of the bandwidths of 1.44, 3, 5, 10, 15 and 20 Mhz and provides DL or UL transmission service to a plurality of UEs in the bandwidth. Different cells may be configured so as to provide different bandwidths.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
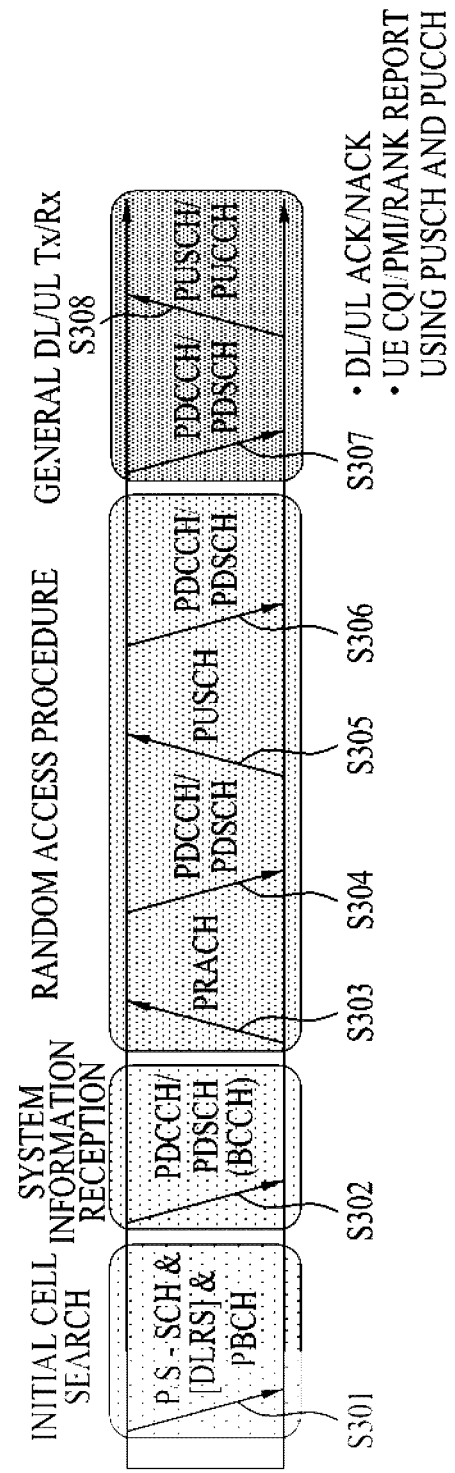
FIG. 3 is a diagram illustrating physical channels used in a 3GPP system and a general signal transmission method using the same.

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

Figure 4:
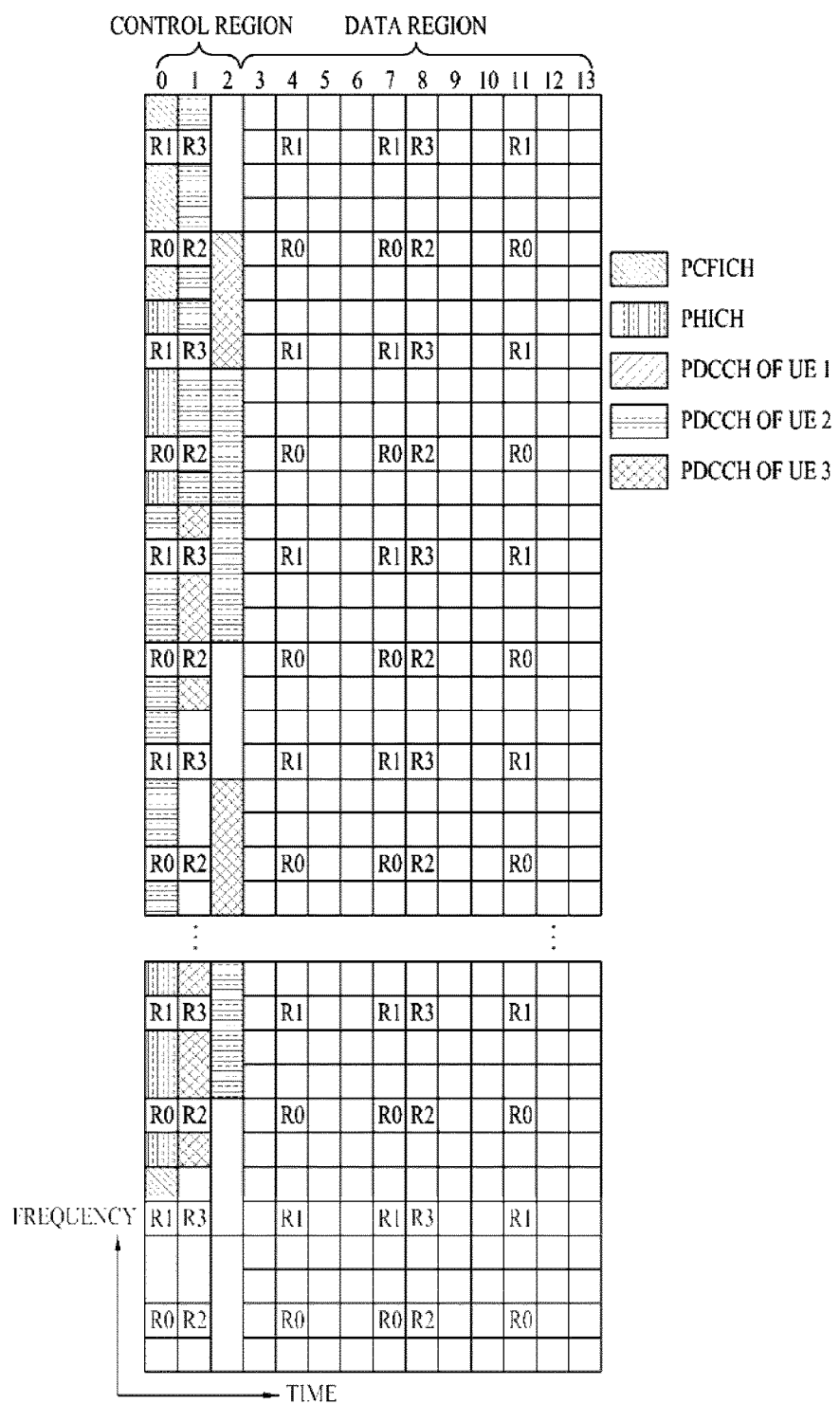
FIG. 4 is a diagram illustrating the structure of a DL radio frame used in an LTE system.

FIG. 4 is a diagram illustrating control channels contained in a control region of one subframe in a DL radio frame.

Referring to FIG. 4, one subframe includes 14 OFDM symbols. The first to third ones of the 14 OFDM symbols may be used as a control region and the remaining 11 to 13 OFDM symbols may be used as a data region, according to subframe configuration. In FIG. 4, R1 to R4 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID. One REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated using binary phase shift keying (BPSK). The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe. In this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through a PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' (e.g. frequency location) and using DCI format 'C', i.e. transport format information (e.g. a transport block size, a modulation scheme, coding information, etc.), is transmitted in a specific subframe, a UE located in a cell monitors the PDCCH, i.e. blind-decodes the PDCCH, using RNTI information thereof in a search space. If one or more UEs having RNTI 'A' are present, the UEs receive the PDCCH and receive a PDSCH indicated by 'B' and 'C' based on the received information of the PDCCH.

Figure 5:
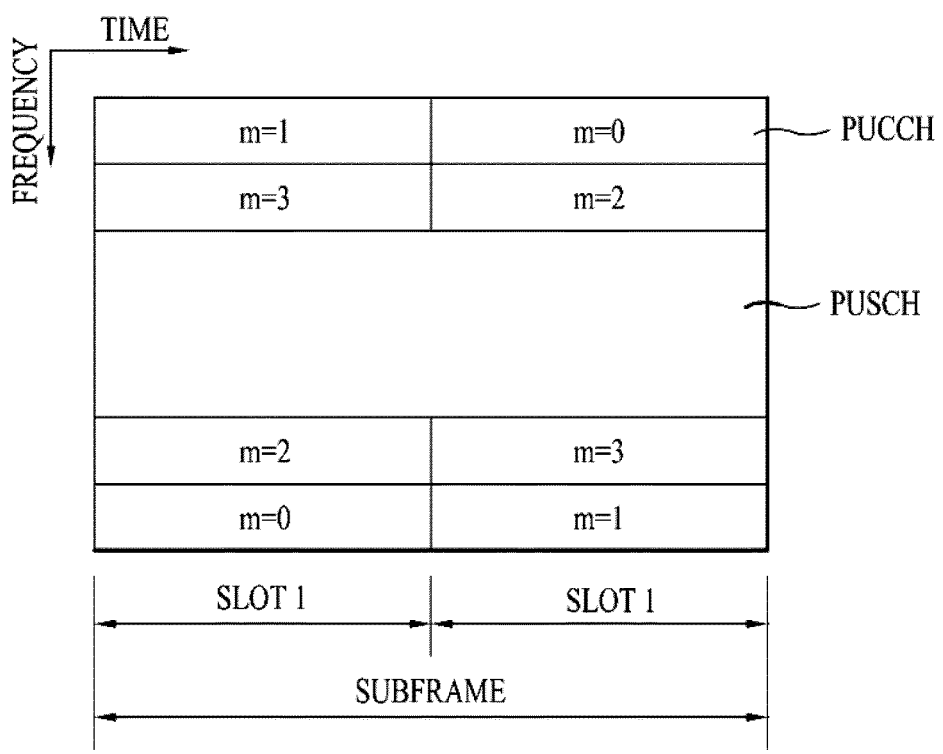
FIG. 5 is a diagram illustrating the structure of a UL subframe in an LTE system.

FIG. 5 is a diagram illustrating the structure of a UL subframe in an LTE system.

Referring to FIG. 5, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a channel quality indicator (CQI) representing a downlink channel state, an RI for Multiple Input and Multiple Output (MIMO), a scheduling request (SR) indicating a request for allocation of UL resources, etc. A PUCCH of a UE uses one RB occupying different frequencies in each slot of a subframe. That is, two RBs allocated to the PUCCH frequency-hop over the slot boundary. Particularly, PUCCHs for m=0, m=1, m=2, and m=3 are allocated to a subframe in FIG. 5.

And, time capable of transmitting a sounding reference signal in a subframe corresponds to a symbol period lastly positioned in a subframe in a time axis and the sounding reference signal is transmitted through a data transmission band in frequency axis. Sounding reference signals of a plurality of UEs transmitted through a last symbol of an identical subframe can be distinguished from each other according to a frequency position.

Figure 6:
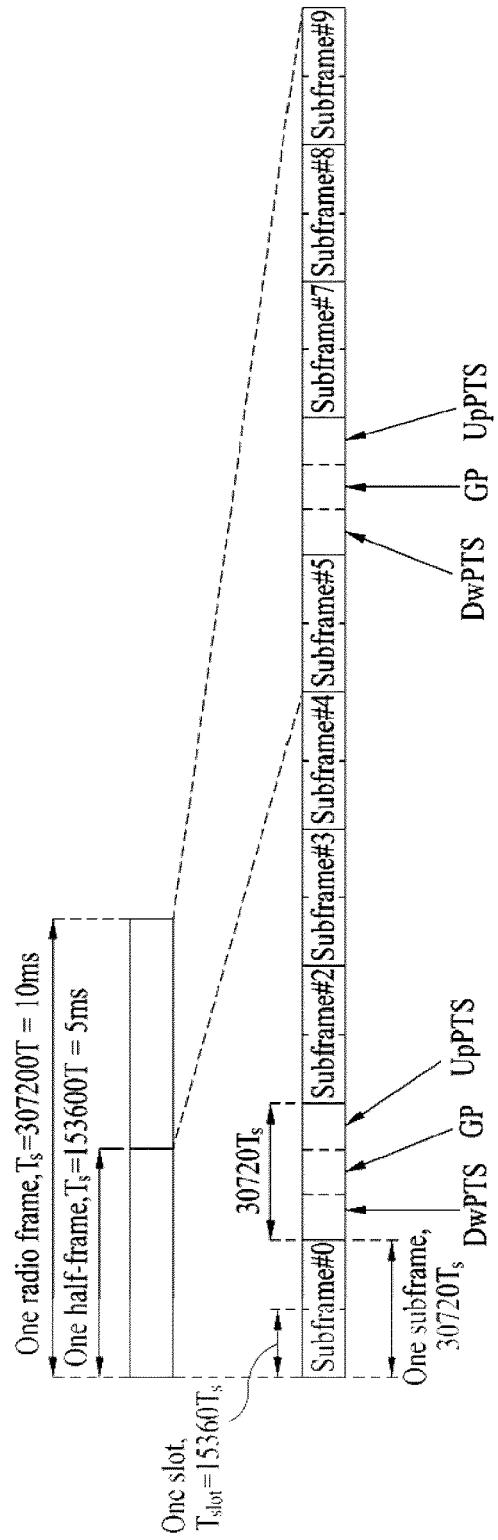
FIG. 6 illustrates a structure of a radio frame in an LTE TDD system.

FIG. 6 illustrates a structure of a radio frame in an LTE TDD system. In the LTE TDD system, a radio frame includes two half frames, and each half frame includes four normal subframes each including two slots, and a special subframe including a downlink pilot time slot (DwPTS), a guard period (GP), and an uplink pilot time slot (UpPTS).

In the special subframe, the DwPTS is used for initial cell search, synchronization, or channel estimation in a UE. The UpPTS is used for channel estimation in an eNB and uplink transmission synchronization of a UE. That is, the DwPTS is used for downlink transmission and the UpPTS is used for uplink transmission. In particular, the UpPTS is used for transmission of a PRACH preamble or SRS. In addition, the GP is a period for removing interference generated in uplink due to multipath delay of a downlink signal between uplink and downlink.

Meanwhile, in an LTE TDD system, a UL/DL configuration is shown in Table 1 below.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1 above, D, U, and S refer to a downlink subframe, an uplink subframe, and the special subframe. In addition, Table 1 also shows downlink-to-uplink switch-point periodicity in an uplink/downlink subframe configuration in each system.

Figure 7:
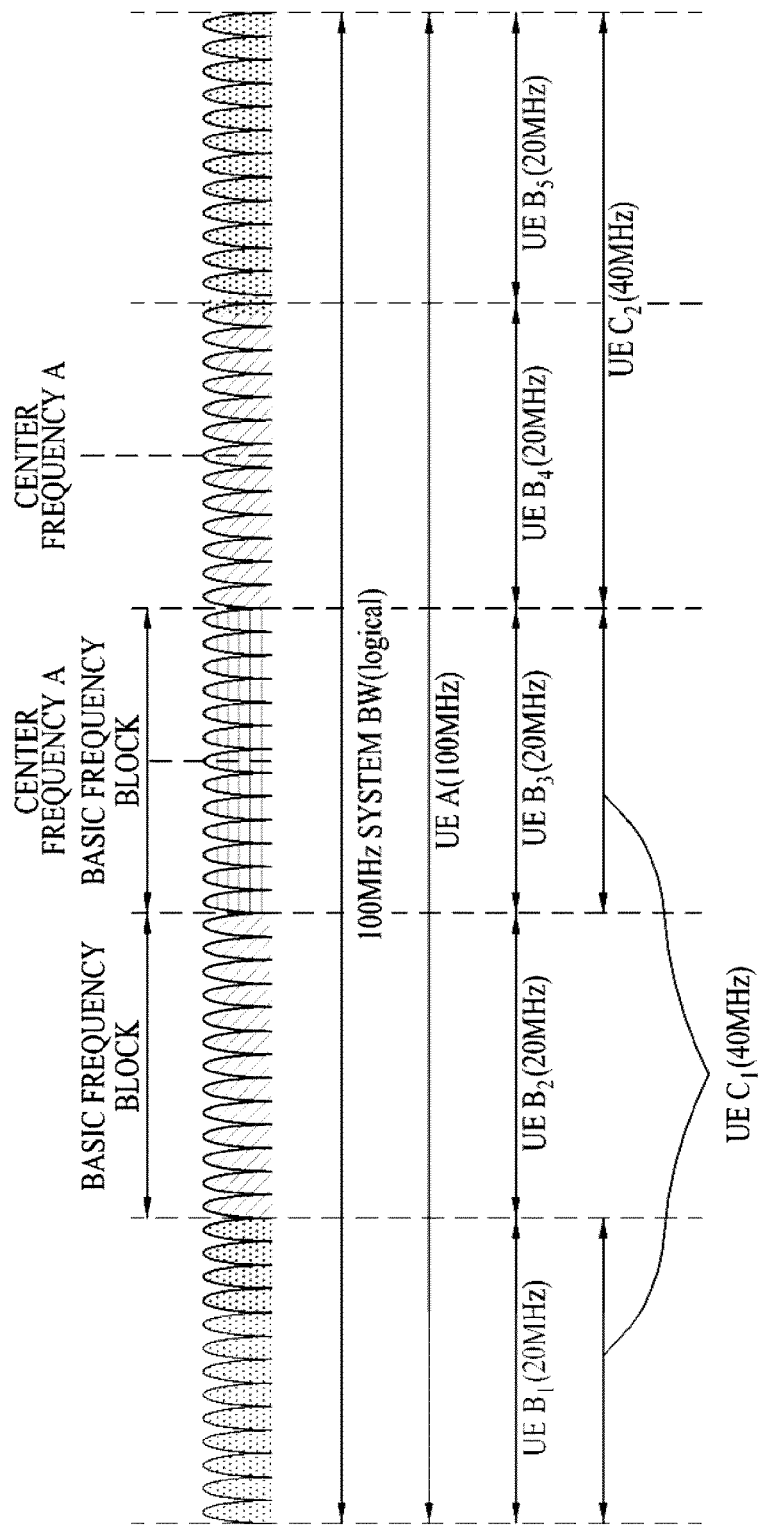
FIG. 7 is a view illustrating concept of a carrier aggregation scheme.

Hereinafter, a carrier aggregation scheme will be described. FIG. 7 is a view illustrating concept of a carrier aggregation scheme.

The carrier aggregation refers to a method of using a plurality of frequency blocks or (logical) cells including uplink resources (or component carriers) and/or downlink resources (or component carriers) by a UE as one large logical frequency band in order to use a wider frequency band by a wireless communication system. Hereinafter, for convenience of description, the term 'component carrier' will consistently be used.

Figure 8:
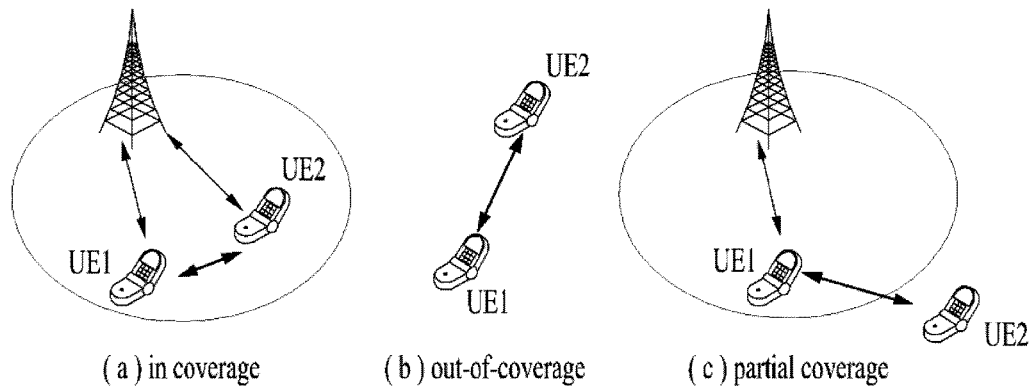
FIG. 8 illustrates exemplary scenarios of D2D communication.

Referring to FIG. 7, a system bandwidth (system BW) has a maximum of 100 MHz as a logical bandwidth. The system BW includes five component carriers. Each component carrier has a maximum of 20 MHz of bandwidth. A component carrier includes one or more physically consecutive subcarriers. Although FIG. 7 illustrates the case in which component carriers have the same bandwidth, the case is purely exemplary, and thus, the component carriers may have different bandwidths. In addition, although FIG. 7 illustrates the case in which the component carriers are adjacent to each other in the frequency domain, FIG. 8 are logically illustrated, and thus, the component carriers may be physically adjacent to each other or may be spaced apart from each other.

Component carriers can use different center frequencies or use one common center frequency with respect to physically adjacent component carriers. For example, in FIG. 8, assuming all component carriers are physically adjacent to each other, center frequency A may be used. In addition, assuming that component carriers are not physically adjacent to each other, center frequency A, center frequency B, etc. may be used with respect to the respective component carriers.

Throughout this specification, a component carrier may correspond to a system band of a legacy system. The component carrier is defined based on a legacy system, and thus, it can be easy to provide backward compatibility and to design the system in a wireless communication environment in which an evolved UE and a legacy UE coexist. For example, when an LTE-A system supports carrier aggregation, each component carrier may correspond to a system band of an LTE system. In this case, the component carrier may have any one of bandwidths of 1.25, 2.5, 5, 10, and 20 Mhz.

When a system band is extended via carrier aggregation, a frequency band used for communication with each UE is defined in a component carrier unit. UE A may use 100 MHz as a system band and perform communication using all five component carriers. UEs $B_1$ to $B_5$ can use only a bandwidth of 20 MHz and perform communication using one component carrier. UEs $C_1$ and $C_2$ can use a bandwidth of 40 MHz and communication using two component carries. The two component carriers may or may not be logically/physically adjacent to each other. UE $C_1$ refers to the case in which two component carriers that are not adjacent to each other are used and UE $C_2$ refers to the case in which two adjacent component carriers are used.

An LTE system may use one downlink component carrier and one uplink component carrier, whereas an LTE-A system may use a plurality of component carriers as illustrated in FIG. 7. In this case, a method for scheduling a data channel by a control channel may be classified into a linked carrier scheduling method and a cross carrier scheduling method.

In more detail, in the linked carrier scheduling method, a control channel transmitted through a specific component carrier schedules only a data channel through the specific component carrier like in a legacy LTE system using a single component carrier.

Meanwhile, in the cross carrier scheduling method, a control channel transmitted through a primary component carrier (primary CC) using a carrier indicator field (CIF) schedules a data channel transmitted through a data channel transmitted through the primary CC or a secondary CC.

A description will be given of a method for controlling uplink transmission power in an LTE system.

A method for controlling, by a UE, uplink transmission power thereof includes open loop power control (OLPC) and closed loop power control (CLPC). The former controls power in such a manner that attenuation of a downlink signal from a base station of a cell to which a UE belongs is estimated and compensated for. OLPC controls uplink power by increasing uplink transmission power when downlink signal attenuation increases as a distance between the UE and the base station increases. The latter controls uplink power in such a manner that the base station directly transmits information (i.e. a control signal) necessary to control uplink transmission power.

The following equation 1 is used to determine transmission power of a UE when a serving cell c transmits only a PUSCH instead of simultaneously transmitting the PUSCH and a PUCCH in a subframe corresponding to a subframe index i in a system that supports carrier aggregation.

$$P_{PUSCH,c}(i) = \min\left\{\begin{array}{l} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{array}\right\} [dBm] \quad \text{[Equation 1]}$$

The following equation 2 is used to determine PUSCH transmission power when the serving cell c simultaneously transmits the PUCCH and the PUSCH in the subframe corresponding to the subframe index i in a system supporting carrier aggregation.

$$P_{PUSCH,c}(i) = \min\left\{\begin{array}{l} 10\log_{10}(\hat{P}_{CMAX,c}(i)\hat{P}_{PUCCH}(i)), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{array}\right\} [dBm] \quad \text{[Equation 2]}$$

Parameters, which will be described in association with Equations 1 and 2, determine uplink transmission power of a UE in the serving cell c. Here, $P_{CMAX,c}(i)$ in Equation 1 indicates maximum transmittable power of the UE in the subframe corresponding to the subframe index i and $\hat{P}_{CMAX,c}(i)$ in Equation 2 indicates a linear value of $P_{CMAX,c}(i)$. $\hat{P}_{PUCCH}(i)$ in Equation 2 indicates a linear value of $P_{PUCCH}(i)$ ($P_{PUCCH}(i)$ indicating PUCCH transmission power in the subframe corresponding to subframe index i).

In Equation 1, $M_{PUSCH,c}(i)$ is a parameter indicating a PUSCH resource allocation bandwidth, which is represented as the number of resource blocks valid for the subframe index i, and is allocated by a base station. $P_{O\_PUSCH,c}(j)$ is a parameter corresponding to the sum of a cell-specific nominal component $P_{O\_NOMINAL\_PUSCH,c}(j)$ provided by a higher layer and a UE-specific component $P_{O\_UE\_PUSCH,c}(j)$ provided by the higher layer and is signaled to the UE by the base station.

j is 1 in PUSCH transmission/retransmission according to an uplink grant and j is 2 in PUSCH transmission/retransmission according to a random access response. In addition, $P_{O\_UE\_PUSCH,c}(2)=0$ and $P_{O\_NOMINAL\_PUSCH,c}(2)=P_{O\_PRE}+\Delta_{PREAMBLE\_Msg3}$. Parameters $P_{O\_PRE}$ and $\Delta_{PREAMBLE\_Msg3}$ are signaled by the higher layer.

$\alpha_c(j)$ is a pathloss compensation factor and a cell-specific parameter provided by the higher layer and transmitted as 3 bits by the base station. $\alpha \in \{0, 0.4, 0.5, 0.6, 0.7, 0.8, 0.9, 1\}$ when j is 0 or 1 and $\alpha_c(j)=1$ when j is 2. $\alpha_c(j)$ is a value signaled to the UE by the base station.

Pathloss $PL_c$ is a downlink pathloss (or signal loss) estimate value in dBs, calculated by the UE, and is represented as $PL_c$=referenceSignalPower−higher layer filteredRSRP. Here, referenceSignalPower can be signaled to the UE by the base station via the higher layer.

$f_c(i)$ is a value indicating current PUSCH power control adjustment state for the subframe index i and can be represented as a current absolute value or accumulated value. When accumulation is enabled on the basis of a parameter provided by the higher layer or a TPC command $\delta_{PUSCH,c}$ is included in a PDCCH along with DCI format 0 for the serving cell c in which CRC is scrambled with temporary C-RNTI, $f_c(i)=f_c(i-1)+\delta_{PUSCH,c}(i-K_{PUSCH})$ is satisfied. $\delta_{PUSCH,c}(i-K_{PUSCH})$ is signaled through the PDCCH with DCI format 0/4 or 3/3A in a subframe $i-K_{PUSCH}$. Here, $f_c(0)$ is the first value after reset of the accumulated value.

$K_{PUSCH}$ is defined in LTE as follows.

For FDD (Frequency Division Duplex), $K_{PUSCH}$ has a value of 4. As to TDD, $K_{PUSCH}$ has values as shown in Table 2.

TABLE 2

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

The UE attempts to decode a PDCCH in DCI format 0/4 with C-RNTI thereof or to decode a PDCCH in DCI format 3/3A and a DCI format for SPS C-RNTI with TPC-PUSCH-RNTI thereof in each subframe in cases other than DRX state. When DCI formats 0/4 and 3/3A for the serving cell c are detected in the same subframe, the UE needs to use $\delta_{PUSCH,c}$ provided in DCI format 0/4. When a TPC command decoded for the serving cell c is not present, DRX is generated or a subframe having index i is a subframe other than an uplink subframe in TDD, $\delta_{PUSCH,c}$ is 0 dB.

Accumulated $\delta_{PUSCH,c}$ which is signaled together with DCI format 0/4 on a PDCCH, is shown in Table 3. When a PDCCH with DCI format 0 is validated through SPS activation or released, $\delta_{PUSCH,c}$ is 0 dB. Accumulated $\delta_{PUSCH,c}$, which is signaled with DCI format 3/3A on a PDCCH, is one of SET1 of Table 3 or one of SET2 of Table 4, determined by a TPC-index parameter provided by the higher layer.

TABLE 3

| TPC Command Field in DCI format 0/3/4 | Accumulated $\delta_{PUSCH,c}$ [dB] | Absolute $\delta_{PUSCH,c}$ [dB] only DCI format 0/4 |
|---|---|---|
| 0 | −1 | −4 |
| 1 | 0 | −1 |
| 2 | 1 | 1 |
| 3 | 3 | 4 |

TABLE 4

| TPC Command Field in DCI format 3A | Accumulated $\delta_{PUSCH,c}$ [dB] |
|---|---|
| 0 | −1 |
| 1 | 1 |

When the UE reaches maximum transmission power $\hat{P}_{CMAX(i)}$ in the serving cell c, a positive TPC command is not accumulated for the serving cell c. Conversely, when the UE reaches minimum transmission power, a negative TPC command is not accumulated.

The following equation 3 is related to uplink power control with respect to a PUCCH in LTE.

$$P_{PUCCH}(i) = \min\left\{\begin{array}{c}P_{CMAX,c}(i),\\ P_{O\_PUCCH} + PL_c + h(n_{CQI}, n_{HARQ}, n_{SR}) +\\ \Delta_{F\_PUCCH}(F) + \Delta_{TxD}(F') + g(i)\end{array}\right\}[dBm] \quad \text{[Equation 3]}$$

In Equation 3, i indicates a subframe index and c indicates a cell index. When a UE is configured by a higher layer to transmit a PUCCH over through antenna ports, $\Delta_{TxD}(F')$ is provided to the UE by the higher layer. In other cases, $\Delta_{TxD}(F')$ is 0. Parameters with respect to a cell having the cell index c will now be described.

$P_{CMAX,c}(i)$ indicates maximum transmission power of a UE, $P_{O\_PUCCH}$ is a parameter corresponding to the sum of cell-specific parameters and signaled by a base station through higher layer signaling, $PL_c$ is a downlink pathloss (or signal loss) estimate value calculated in dBs by the UE and is represented as $PL_c$=referenceSignalPower−higher layer filteredRSRP. h(n) is a value depending on PUCCH format, $n_{CQI}$ is the number of information bits with respect to channel quality information (CQI) and $n_{HARQ}$ indicates the number of HARQ bits. In addition $\Delta_{F\_PUCCH}(F)$ is a relative value with respect to PUCCH format 1a and a value corresponding to PUCCH format #F, which is signaled by the base station through higher layer signaling. g(i) indicates a current PUCCH power control adjustment state of a subframe having index i.

g(0)=0 when $P_{O\_UE\_PUCCH}$ is changed in the higher layer and g(0)=$\Delta P_{rampup}$+$\delta_{msg2}$ otherwise. $\delta_{msg2}$ is a TPC command indicated in a random access response $\Delta P_{rampup}$ corresponds to total power ramp-up from the first to last preambles, provided by the higher layer.

When a UE reaches maximum transmission power $P_{CMAX,c}(i)$ in a primary cell, a positive TPC command is not accumulated for the primary cell. When the UE reaches minimum transmission power, a negative TPC command is not accumulated. The UE resets accumulation when $P_{O\_UE\_PUCCH}$ is changed by the higher layer or upon reception of a random access response.

Tables 5 and 6 show $\delta_{PUCCH}$ indicated by a TPC command in DCI formats. Particularly, Table 5 shows $\delta_{PUCCH}$ indicated in DCI formats other than DCI format 3A and Table 6 shows $\delta_{PUCCH}$ indicated in DCI format 3A.

TABLE 5

| TPC Command Field in DCI format 1A/1B/1D/1/2A/2B/2C/2D/2/3 | $\delta_{PUCCH}$ [dB] |
|---|---|
| 0 | −1 |
| 1 | 0 |
| 2 | 1 |
| 3 | 3 |

TABLE 6

| TPC Command Field in DCI format 3A | $\delta_{PUCCH}$ [dB] |
|---|---|
| 0 | −1 |
| 1 | 1 |

Equation 4 in the following corresponds to an equation related to power control of a sounding reference signal (SRS) in LTE system.

$$P_{SRS,c}(i) = \min\left\{ \begin{array}{l} P_{CMAX,c}(i), \\ P_{SRS\_OFFSET,c}(m) + 10\log_{10}(M_{SRS,c}) + \\ P_{O\_PUSCH,c}(j) + \alpha_c(j) \cdot PL_c + f_c(i) \end{array} \right\} [dBm] \quad \text{[Equation 4]}$$

In Equation 4, i corresponds to a subframe index and c corresponds to a cell index. In this case, $P_{CMAX,c}(i)$ corresponds to maximum power capable of being transmitted by a UE and $P_{SRS\_OFFSET,c}(m)$ corresponds to a value configured by an upper layer. If m is 0, it may correspond to a case of transmitting a periodic sounding reference signal. If m is not 0, it may correspond to a case of transmitting an aperiodic sounding reference signal. $M_{SRS,c}$ corresponds to a sounding reference signal bandwidth on a subframe index i of a serving cell c and is represented by the number of resource blocks.

$f_c(i)$ corresponds to a value indicating a current PUSCH power control adjustment status for a subframe index i of a serving cell c. $P_{O\_PUSCH,c}(i)$ and $\alpha_c(j)$ are also identical to what is mentioned earlier in Equation 1 and 2.

Hereinafter, a Sounding Reference Signal (SRS) will be described.

The SRS is composed of constant amplitude zero auto correlation (CAZAC) sequences. SRSs transmitted from several UEs are CAZAC sequences $r_{SRS}(n) = r_{u,v}^{(\alpha)}(n)$ having different cyclic shift values α according to Equation 1.

$$\alpha = 2\pi \frac{n_{SRS}^{cs}}{8} \quad \text{[Equation 1]}$$

where, $n_{SRS}^{cs}$ is a value set to each UE by a higher layer and has an integer value of 0 to 7. Accordingly, the cyclic shift value may have eight values according to $n_{SRS}^{cs}$.

CAZAC sequences generated from one CAZAC sequence through cyclic shift have zero correlation values with sequences having different cyclic shift values. Using such property, SRSs of the same frequency domain may be divided according to CAZAC sequence cyclic shift values. The SRS of each UE is allocated onto the frequency axis according to a parameter set by the eNB. The UE performs frequency hopping of the SRS so as to transmit the SRS with an overall uplink data transmission bandwidth.

Hereinafter, a detailed method of mapping physical resources for transmitting SRSs in an LTE system will be described.

In order to satisfy transmit power $P_{SRS}$ of a UE, an SRS sequence $r^{SRS}(n)$ is first multiplied by an amplitude scaling factor $\beta_{SRS}$ and is then mapped to a resource element (RE) having an index (k, l) from $r^{SRS}(0)$ by Equation 6.

$$a_{2k+k_0,l} = \begin{cases} \beta_{SRS} r^{SRS}(k) & k = 0, 1, \ldots, M_{sc,b}^{RS} - 1 \\ 0 & \text{otherwise} \end{cases} \quad \text{[Equation 6]}$$

where, $k_0$ denotes a frequency domain start point of an SRS and is defined by Equation 7.

$$k_0 = k_0' + \sum_{b=0}^{B_{SRS}} 2M_{sc,b}^{RS} n_b \quad \text{[Equation 7]}$$

where, $n_b$ denotes a frequency location index. $k'_0$ for a general uplink subframe is defined by Equation 8 and $k'_0$ for an uplink pilot time is defined by Equation 9.

$$k_0' = (\lfloor N_{RB}^{UL}/2 \rfloor - m_{SRS,0}/2)N_{SC}^{RB} + k_{TC} \quad \text{[Equation 8]}$$

$$k_0' = \begin{cases} (N_{RB}^{UL} - m_{SRS,0}^{max})N_{sc}^{NB} + k_{TC} & \text{if } ((n_f \bmod 2) \times (2 - N_{SP}) + n_{hf}) \\ & \bmod 2 = 0 \\ k_{TC} & \text{otherwise} \end{cases} \quad \text{[Equation 9]}$$

In Equations 4 and 5, $k_{TC}$ denotes a transmissionComb parameter signaled to a UE via a higher layer and has a value of 0 or 1. In addition, $n_{hf}$ is 0 in an uplink pilot time slot of a first half frame and is 0 an uplink pilot slot of a second half frame. $M_{sc,b}^{RS}$ is the length, that is, the bandwidth, if the SRS sequence expressed in subcarrier units defined by Equation 10.

$$M_{sc,b}^{RS} = m_{SRS,b} N_{sc}^{RB}/2 \quad \text{[Equation 10]}$$

In Equation 10, $m_{SRS,b}$ is a value signaled from an eNB according to an uplink bandwidth $N_{RB}^{UL}$.

The UE may perform frequency hopping of the SRS so as to transmit the SRS with the overall uplink data transmission bandwidth. Such frequency hopping is set by a parameter $b_{hop}$ having a value of 0 to 3 received from a higher layer.

If frequency hopping of the SRS is inactivated, that is, if $b_{hop} \geq B_{SRS}$, a frequency location index $n_b$ has a constant value as shown in Equation 11. Here, $n_{RRC}$ is a parameter received from a higher layer.

$$n_b = \lfloor 4n_{RRC}/m_{SRS,b} \rfloor \bmod N_b \quad \text{[Equation 11]}$$

Meanwhile, if frequency hopping of the SRS is activated, that is, $b_{hop} < B_{SRS}$, a frequency location index $n_b$ is defined by Equations 12 and 13.

$$n_b = \begin{cases} \lfloor 4n_{RRC}/m_{SRS,b} \rfloor \bmod N_b & b \leq b_{hop} \\ \{F_b(n_{SRS}) + \lfloor 4n_{RRC}/m_{SRS,b} \rfloor\} \bmod N_b & \text{otherwise} \end{cases} \quad \text{[Equation 12]}$$

-continued $$F_b(n_{SRS}) = \begin{cases} (N_b/2)\left\lfloor\dfrac{n_{SRS} \bmod \prod_{b'=b_{hop}}^{b} N_{b'}}{\prod_{b'=b_{hop}}^{b-1} N_{b'}}\right\rfloor + \\ \qquad\qquad\left\lfloor\dfrac{n_{SRS} \bmod \prod_{b'=b_{hop}}^{b} N_{b'}}{2\prod_{b'=b_{hop}}^{b-1} N_{b'}}\right\rfloor & \text{if } N_b \text{ even} \\ \lfloor N_b/2\rfloor\left\lfloor n_{SRS}\Big/\prod_{b'=b_{hop}}^{b-1} N_{b'}\right\rfloor & \text{if } N_b \text{ odd} \end{cases}$$

[Equation 13]

where, $n_{SRS}$ is a parameter used to calculate the number of times of transmitting the SRS and is defined by Equation 14.

$$n_{SRS} = \begin{cases} 2N_{SP}n_f + 2(N_{SP}-1)\left\lfloor\dfrac{n_s}{10}\right\rfloor + \left\lfloor\dfrac{T_{offset}}{T_{offset\_max}}\right\rfloor, & \text{for 2 ms SRS periodicity of TDD frame structure} \\ \lfloor(n_f \times 10 + \lfloor n_s/2\rfloor)/T_{SRS}\rfloor, & \text{otherwise} \end{cases}$$

[Equation 14]

In Equation 14, $T_{SRS}$ denotes the periodicity of SRS and $T_{offset}$ denotes a subframe offset of an SRS. In addition, $n_s$ denotes a slot number and $n_f$ denotes a frame number.

A UE-specific SRS configuration index $I_{SRS}$ for setting the periodicity $T_{SRS}$ and the subframe offset $T_{offset}$ of a UE-specific SRS signal is shown in Table 7-Table 10 according to FDD and TDD. In particular, Table 7 and Table 8 indicate a FDD system and a TDD system, respectively. Table 7 and Table 8 in the following show a period related to a triggering type 0, i.e., a periodic SRS, and offset information.

TABLE 7

| SRS Configuration Index $I_{SRS}$ | SRS Periodicity $T_{SRS}$ (ms) | SRS Subframe Offset $T_{offset}$ |
|---|---|---|
| 0-1 | 2 | $I_{SRS}$ |
| 2-6 | 5 | $I_{SRS} - 2$ |
| 7-16 | 10 | $I_{SRS} - 7$ |
| 17-36 | 20 | $I_{SRS} - 17$ |
| 37-76 | 40 | $I_{SRS} - 37$ |
| 77-156 | 80 | $I_{SRS} - 77$ |
| 157-316 | 160 | $I_{SRS} - 157$ |
| 317-636 | 320 | $I_{SRS} - 317$ |
| 637-1023 | reserved | reserved |

TABLE 8

| SRS Configuration Index $I_{SRS}$ | SRS Periodicity $T_{SRS}$ (ms) | SRS Subframe Offset $T_{offset}$ |
|---|---|---|
| 0-1 | 2 | $I_{SRS}$ |
| 2-6 | 5 | $I_{SRS} - 2$ |
| 7-16 | 10 | $I_{SRS} - 7$ |
| 17-36 | 20 | $I_{SRS} - 17$ |
| 37-76 | 40 | $I_{SRS} - 37$ |
| 77-156 | 80 | $I_{SRS} - 77$ |
| 157-316 | 160 | $I_{SRS} - 157$ |
| 317-636 | 320 | $I_{SRS} - 317$ |
| 637-1023 | reserved | reserved |

Meanwhile, in case of the periodic SRS, transmission is performed in a subframe satisfying Equation 15 in the following in a FDD system or a TDD system where $T_{SRS}$ is greater than 2 ($T_{SRS}>2$). Yet, in Equation 15, $k_{SRS}$ corresponds to $\{0, 1, \ldots, 9\}$ in case of the FDD system, whereas $k_{SRS}$ is determined according to Table 9 in the following in case of the TDD system.

$$(10 \cdot n_f k_{SRS} - T_{offset}) \bmod T_{SRS} = 0 \quad \text{[Equation 15]}$$

TABLE 9

| | subframe index n | | | | | | | | | |
|---|---|---|---|---|---|---|---|---|---|---|
| | | 1 | | | | | 6 | | | |
| | 0 | 1st symbol of UpPTS | 2nd symbol of UpPTS | 2 | 3 | 4 | 5 | 1st symbol of UpPTS | 2nd symbol of UpPTS | 7 | 8 | 9 |
| $k_{SRS}$ in case UpPTS length of 2 symbols | 0 | | 1 | 2 | 3 | 4 | | 5 | 6 | 7 | 8 | 9 |
| $k_{SRS}$ in case UpPTS length of 1 symbol | 1 | | | 2 | 3 | 4 | | 6 | | 7 | 8 | 9 |

And, in case of a TDD system where $T_{SRS}$ corresponds to 2 in Table 8, transmission is performed in a subframe satisfying Equation 16 in the following.

$$(k_{SRS} - T_{offset}) \bmod 5 = 0 \quad \text{[Equation 16]}$$

Table 10 and Table 11 in the following show a period related to a triggering type 1, i.e., an aperiodic SRS, and offset information. In particular, Table 10 and Table 11 indicate a FDD system and a TDD system, respectively.

TABLE 10

| SRS Configuration Index $I_{SRS}$ | SRS Periodicity $T_{SRS, 1}$ (ms) | SRS Subframe Offset $T_{offset, 1}$ |
|---|---|---|
| 0-1 | 2 | $I_{SRS}$ |
| 2-6 | 5 | $I_{SRS} - 2$ |

TABLE 10-continued

| SRS Configuration Index $I_{SRS}$ | SRS Periodicity $T_{SRS, 1}$ (ms) | SRS Subframe Offset $T_{offset, 1}$ |
|---|---|---|
| 7-16 | 10 | $I_{SRS} - 7$ |
| 17-31 | reserved | reserved |

TABLE 11

| SRS Configuration Index $I_{SRS}$ | SRS Periodicity $T_{SRS, 1}$ (ms) | SRS Subframe Offset $T_{offset, 1}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS} - 10$ |
| 15-24 | 10 | $I_{SRS} - 15$ |
| 25-31 | reserved | reserved |

Meanwhile, if a triggering bit of the aperiodic SRS is detected in a subframe #n, an aperiodic SRS corresponding to the triggering bit is transmitted in a first subframe satisfying Equation 17 or Equation 18 in the following appearing after a subframe index #n+k (where k≥4). In particular, Equation 17 in the following is used for a FDD system or a TDD system of which $T_{SRS}$ is greater than 2 ($T_{SRS}$>2) in the Table 11. Equation 18 in the following is used for a TDD system of which $T_{SRS}$ is equal to 2 ($T_{SRS}$=2) in the Table 11. Yet, in case of the FDD system, $k_{SRS}$ corresponds to {0, 1, . . . , 9}. In case of the TDD system, $k_{SRS}$ is determined according to the Table 9.

$$(10 \cdot n_f + k_{SRS} - T_{offset,1}) \mod T_{SRS,1} = 0 \quad \text{[Equation 17]}$$

$$(k_{SRS} - T_{offset,1}) \mod 5 = 0 \quad \text{[Equation 18]}$$

D2D (Device to Device) Communication

Hereinafter, D2D communication based on an LTE system will be described. D2D may be referred to as direct communication between UEs or a side link. Although a UE generally means a terminal of a user, if a network equipment such as an eNB transmits and receives a signal in accordance with a D2D communication mode, the corresponding network equipment may be regarded as a kind of UE.

FIG. 8 illustrates exemplary scenarios of D2D communication. D2D resources may be allocated from UL resources (for example, UL frequency resources in case of FDD and UL subframe in case of TDD). (a) In case of in-coverage D2D communication, the network controls D2D resources used for D2D communication. The network may allocate a specific resource to a transmitting UE or allocate a pool of D2D resources that may be selected by a UE. (b) In case of out-of-coverage D2D communication, since the network cannot control D2D resources directly, the UE uses a D2D resource which is previously configured. (c) In case of partial coverage D2D communication, although a UE located outside coverage may use parameters which are previously configured, a UE located inside coverage may use a D2D resource acquired from the network.

For convenience, it is assumed that a UE1 selects a resource unit (RU) which is a specific D2D resource, within a resource pool and is operated to transmit a D2D signal by using the selected RU. The resource pool means a set of a series of D2D resources. It is assumed that information on a resource pool to which the UE1 may transmit a signal is configured for a UE2 which is a receiving UE. The UE2 detects the signal of the UE1 within the corresponding resource pool. If the UE1 is within a connection range of the eNB, the eNB may notify the UE1 of information on the resource pool, and the UE1 is outside a connection range of the eNB, another UE may notify the UE1 of information on the resource pool or the information on the resource pool may be determined as a previously defined resource. Generally, the resource pool includes a plurality of RUs, and each UE may select one or a plurality of RUs and use the selected RU for its D2D signal transmission.

Figure 9:
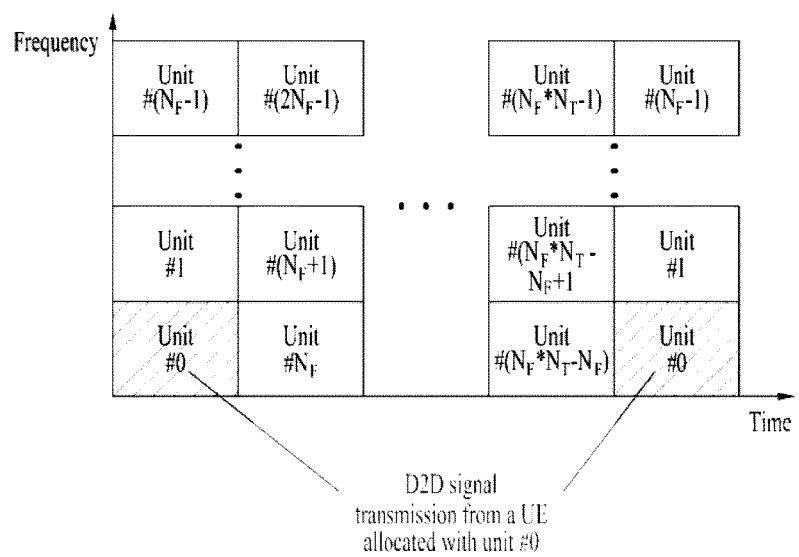
FIG. 9 illustrates an example of D2D RU.

FIG. 9 illustrates an example of D2D RU. For convenience, it is assumed that all frequency resources are divided into NF number of resources and all time resources are divided into NT number of resources, so as to define a total of $N_F * N_T$ number of RUs.

In FIG. 9, it may be regarded that the corresponding resource pool is repeated at a cycle of $N_T$ subframe. For example, one RU may be repeated periodically as shown in FIG. 9.

Alternatively, an index of a physical RU into which one logic RU is mapped may be changed based on a previously given pattern in accordance with time to obtain diversity effect in view of a time or frequency dimension. In this RU structure, the resource pool may mean a set of RUs that may be used for transmission by a UE which desires to transmit a D2D signal.

The aforementioned resource pool may be more subdivided. For example, the resource pool may be divided in accordance with a content of a D2D signal transmitted from the corresponding resource pool. For example, the content of the D2D signal may be divided as follows, and a separate resource pool may be configured for the content of each D2D signal.

SA (Scheduling assignment): SA may include information on a location of a resource for a D2D data channel transmitted after SA, information on a modulation and coding scheme (MCS) or MIMO transmission scheme, which is required for demodulation of a data channel, and information on timing advance (TA). The SA may be transmitted by being multiplexed with D2D data on the same RU. In this case, an SA resource pool may mean a resource pool to which the SA is transmitted by being multiplexed with D2D data. The SA may be referred to as a side link control channel (SCI), and may be transmitted through a D2D control channel (e.g., PSCCH).

D2D data channel: The D2D data channel is a channel for transmitting user data scheduled through SA, and a resource pool for the D2D data channel may be configured.

Discovery channel: The discovery channel is a channel for transmitting a discovery signal, which includes information such as ID of a transmitting UE, from the transmitting UE to allow a neighboring UE to discover the transmitting UE, and a resource pool for the discovery channel may be configured.

Meanwhile, even in case of the same content of the D2D signal, different resource pools may be used depending on transmission and reception attributes of the D2D signal. For example, even in case of the same type of D2D data channel or the same type of discovery channel, the D2D signal may be transmitted on different resource pools considering (i) a scheme for determining a transmitting timing of a D2D signal (e.g., whether the D2D signal is transmitted at the time when a synchronization reference signal is received or is transmitted using a certain timing advance at the time when the synchronization reference signal is received), (ii) a resource allocation scheme (e.g., whether an eNB designates a transmission resource of each D2D signal per transmitting UE or each transmitting UE selects a transmission resource of a D2D signal within a resource pool), (iii) a signal format (e.g., the number of symbols reserved by each D2D signal at one subframe and the number of subframes used for transmission of one D2D signal), (iv) signal strength from an eNB, and (v) transmission power strength of a D2D UE.

As described above, the term 'D2D' may be referred to as a side link (SL), and 'SA' may be referred to as a physical sidelink control channel (PSSCH). The D2D synchronization signal may be referred to as SSS (sidelink synchronization signal), which may be transmitted through a PSBCH (physical sidelink broadcast channel). The PSBCH transmits the most basic information (e.g., system information such as SL-MIB) prior to D2D communication, and may be referred to as PD2DSCH (physical D2D synchronization channel). The discovery channel may be used to transmit a signal (e.g., discovery signal included in ID of UD) for allowing a UE to notify a neighboring UE of its presence.

Meanwhile, narrow D2D communication may be distinguished from D2D discovery. For example, if only a UE which performs narrow D2D communication transmits a PSBCH together with SSS (except UE which performs D2D discovery), measurement of the SSS may be performed using a DMRS of the PSBCH. An out-of-coverage UE may measure the DMRS of the PSBCH (e.g., RSRP, etc.) and determine whether it may be a synchronization source, based on the measured result.

Figure 10:
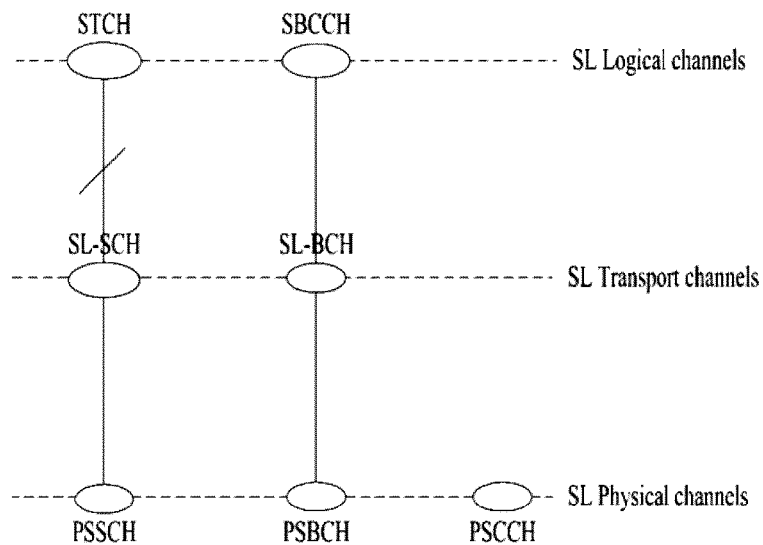
FIG. 10 illustrates side link (SL) channels.

FIG. 10 illustrates side link (SL) channels. SL channels shown in FIG. 10 may be for D2D communication (e.g., narrow D2D communication).

Referring to FIG. 10, an SL traffic channel (STCH) and an SL broadcast control channel (SBCCH) are logical channels. The STCH is used to transmit user data from an application, and is connected with an SL-SCH (SL shared channel). The SL-SCH which is a transport channel is connected to the PSSCH. The SBCCH signals information required for synchronization in out-of-coverage/partial coverage scenarios or information required for synchronization between UEs located at their respective cells different from each other. The SBCCH is connected to the SL-BCH which is a transport channel. The SL-BCH is connected to the PSBCH.

The PSCCH (Physical SL Control CHannel) serves to perform a similar function to a function of a PDCCH in the legacy communication between UE and eNB. The PSCCH is used to transmit scheduling assignment (SA). The SA may be referred to as sidelink control information (SCI).

For convenience of description, a method for enabling an eNB to directly indicate a transport resource of a D2D transmitting UE in D2D communication is referred to as a Mode 1, and a method for configuring a transport resource region in advance or enabling an eNB to designate a transport resource region and a UE to directly select a transport resource is referred to as a Mode 2. In D2D discovery, a case where the eNB directly indicates a resource is referred to as a Type 2, and a case where a UE directly selects a transport resource in a resource region which is previously configured or a resource region indicated by an eNB is referred to as a Type 1.

For example, in the Mode 1, the eNB designates a resource which will be used for D2D communication within a resource pool. In the Mode 2, the UE may select a resource pool from a set of resource pools which are allocated, and may directly select a D2D resource which will be used, from the selected resource pool. Therefore, the UE may be in RRC connected state in case of the Mode 1, whereas the UE may be in RRC idle state or out-of-coverage state in case of the Mode 2.

Figure 11:
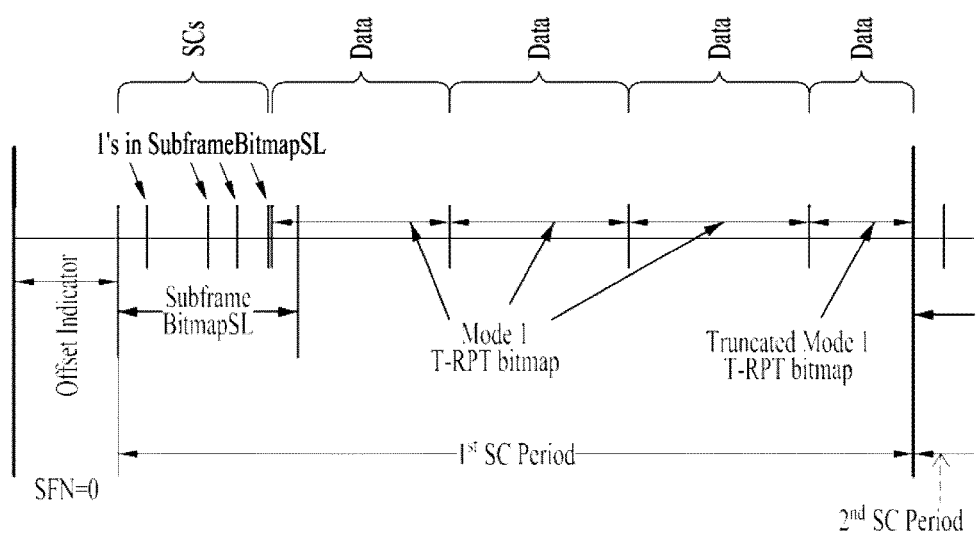
FIG. 11 illustrates a D2D communication mode 1.

FIG. 11 illustrates a D2D communication mode 1. According to PSCCH/PSSCH structure for D2D communication, a set of subframes (i.e., subframe bitmap) is divided into two regions (e.g., control region and data region). Whether each subframe can be used for D2D communication may be indicated through a subframe bitmap.

Referring to FIG. 11, an SC period (SL control period) starts at offset from SFN=0, and may be repeated periodically. The SC period starts from a control region that includes SCI transmitted by the PSCCH, and a higher layer parameter 'SubframeBitmapSL' indicates a subframe used for PSCCH transmission. A data region starts after the last bit set to 1 at 'SubframeBitmapSL'. The data region corresponds to another bit map, that is, T-RPT bitmap. The T-RPT bitmap indicates subframes used for data transmission. As shown in FIG. 11, a subframe pattern by the T-RTP bitmap is repeated until the SC period ends. The last T-RPT bitmap is cut in accordance with end of the SC period. The T-RPT bitmap is dynamic, and may be configured differently for each SC period and each UE.

The mode 2 is operated similarly to the Mode 1 shown in FIG. 11. However, the Mode 2 is different from the Mode 1 in that a start point of the data region in the Mode 2 is not determined based on SubframeBitmapSL. The start point of the data region in the Mode 2 has a fixed offset from the start point of the SC period.

UE Cooperative Scheme

In the recent 3GPP standardization group, Elevation Beamforming/Full-Dimension (FD) MIMO for LTE related to a MIMO scheme has been discussed, and it is provided that maximum 16 transmitting antennas are supported. More transmitting antennas, for example, 32 transmitting antennas may be supported later.

In this way, although the number of transmitting antennas of a network node corresponding to an eNB or base station is greatly increased, the number of receiving antennas of a UE is not increased in proportional to increase of the number of transmitting antennas due to UE implementation.

Meanwhile, in a generalized MIMO system, maximum multiplexing gain may be expressed as degrees of freedom (DoF), which may be defined as expressed by the following Equation 19.

$$\eta = \lim_{\rho \to \infty} \frac{C_\Sigma(\rho)}{\log(\rho)} \qquad \text{[Equation 19]}$$

In the Equation 19, $\rho$ means SNR, and $C_\Sigma(\rho)$ means sum capacity in SNR $\rho$. By assuming M number of inputs and N number of outputs in a PTP (point-to-point) case, the Equation 19 may be expressed as follows.

$$\eta(PTP)=\min(M,N) \qquad \text{[Equation 20]}$$

If the number of connection UEs per unit time within coverage is small, for example, the number of transmitting antennas of eNB>>the number of UEs which receive data at a specific time, Equation 21 may be obtained from the Equation 20.

$$DoF=\min(N_{Tx\_eNB}, K \cdot N_{Rx\_UE}) \qquad \text{[Equation 21]}$$

In the Equation 21, K means the number of connection UEs. $N_{Tx\_eNB}$ is the number of transmitting antennas of the eNB, and $N_{Rx\_UE}$ is the number of receiving antennas of each UE.

Referring to DoF equation in the Equation 21, if $K*N_{Rx\_UE}$ is sufficiently smaller than $N_{Tx\_eNB}$, it is noted that increase of K and/or $N_{Rx\_UE}$ may increase DoF. DoF may be regarded as a slope of an SNR to through graph. For example, if DoF is increased to two times, the slope (or capacity) of the throughput graph becomes two time.

The present invention suggests matters to be considered if K and NRx_UE are increased. In more detail, two suggestions for increasing DoF will be described.

For example, UE cooperation, which will be described later, may be performed through at least one of the two suggestions. Alternatively, any one suggestion may only be selected by the UE or eNB. For example, the eNB may include information on an operation mode in corresponding signaling information when signaling information on UE cooperation. For another example, the UE may report a preferred mode or select and report a specific mode when requesting UE cooperation.

Suggestion 1

According to the suggestion 1, a method for increasing K in the Equation 21 is considered. According to the suggestion 1, the eNB transmits one data to a target UE (TUE) and a helper UE (HUE), divisionally. Afterwards, respective data segments are merged based on communication between UEs such as PTP communication (e.g., D2D).

Figure 12:
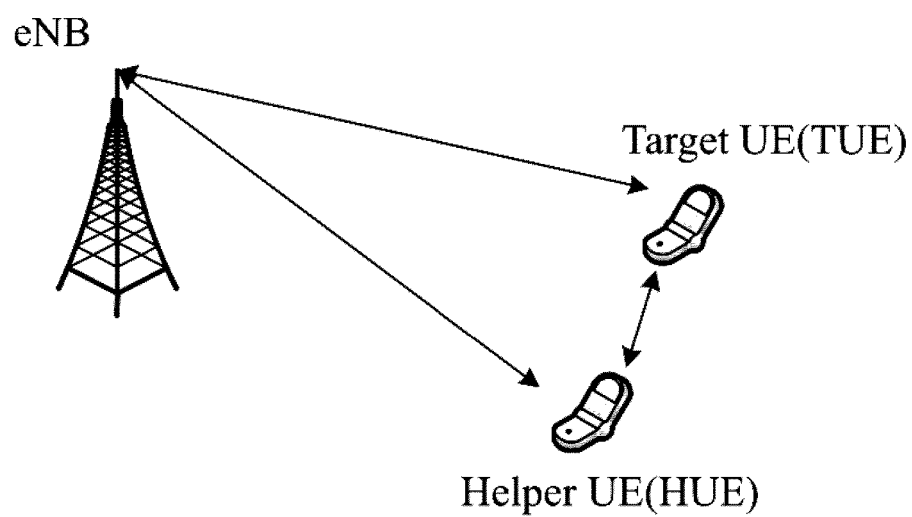
FIG. 12 is a view illustrating UE cooperation according to one embodiment of the present invention.

FIG. 12 is a view illustrating UE cooperation according to one embodiment of the present invention.

Referring to FIG. 12, in order to increase K in the DoF equation of the Equation 21, the eNB transmits data, which should be transmitted to the TUE, to the TUE and the HUE, divisionally. Then, the TUE receives data from the HUE. That is, one or a plurality of HUEs receive the data for the TUE, and the HUE may forward the corresponding data to the TUE through cooperation between the UEs. This may be regarded as a scheme for increasing DoF by increasing the number of receiving UEs in a state that the number of Rx antennas of the UE cannot be increased.

In FIG. 12, the HUE includes an entity, which receives/decodes a DL signal and forwards the received/decoded result to the TUE through UE cooperation, without limitation to a user equipment.

The following matters for the aforementioned UE cooperation should be considered.

(1) HUE Selection

The TUE may request neighboring UEs of a cooperation through a D2D signal or proximity service. If the TUE receives a feedback from another UE with respect to the cooperation request, that is, if the TUE identifies that there is a UE, which can be operated as the HUE, in the periphery thereof, the TUE may request the eNB of DL transmission based on UE cooperation.

The request transmitted from the TUE to the eNB may include information (e.g., UE ID) on one or a plurality of HUE candidates. For example, the TUE may determine HUE candidates and/or a priority among the HUE candidates based on the result obtained by measuring the signal from the corresponding candidate. That is, the TUE performs measurement for a specific signal (e.g., D2D synchronization signal, uplink SRS, and feedback signal of HUE candidate for cooperation request of TUE) transmitted from the HUE candidate. The TUE may determine the HUE in accordance with the result obtained by measuring the signal or configure a priority among the HUEs, and may report the determined HUE and/or priority to the eNB.

If the TUE knows a candidate UE, which enables cooperation, in advance, the TUE may report information on the corresponding UE to the eNB without measurement and request the eNB of paring for cooperation.

For another example, the respective UEs within eNB coverage may report to the eNB that they can be operated as the HUEs. If the TUE requests the eNB to transmit data through cooperation, or if a size of data which will be transmitted to the TUE is a certain level or more, the eNB may transmit a DL signal by paring the TUE with the HUE candidate.

If pairing between the HUE and the TUE is required, for active pairing, the eNB may transmit a specific signal for measurement to the HUE candidate and the TUE or may command the HUE candidate and the TUE to perform measurement for the signal received from the other party. The HUE candidate and the TUE may perform paring in accordance with the measured result. For example, the eNB may command the TUE to measure a UL signal or D2D signal, such as SRS transmitted from the HUE, and may forward information required for measurement of the corresponding signal to the TUE.

If there is a request from the TUE or data transmission of much capacity to the TUE is required, the eNB may select the HUE based on location information of each UE. The eNB may provide the TUE with information (e.g., UE ID) on the selected HUE. Alternatively, the eNB may command the HUEs to transmit a specific signal and command the TUE to report the result obtained by measuring the signal transmitted from the HUE, whereby pairing between the TUE and the HUE may be performed.

(2) Data Distribution

Since the TUE and the HUE receive data divisionally, the eNB may provide the TUE with information on relation between the divisionally transmitted data.

For example, the eNB may classify the data transmitted to each UE, based on a certain unit such as a codeword index. The eNB may notify the TUE or each UE of the data unit and/or data index transmitted to each UE.

For example, if the eNB should transmit 20 codewords to the TUE, the eNB may transmit 10 codewords to the TUE and transmit the other 10 codewords to the HUE. Each UE performs decoding and ACK/NACK procedure for the codewords received thereto. The HUE which has completed reception of the data (e.g., 10 codewords) for the TUE from the eNB may transmit the received data to the TUE.

(3) Cooperative Time Between UEs

The eNB may allocate time and/or frequency resources for cooperation between UEs to the TUE and the HUE. The eNB should perform scheduling by considering the time for transmitting the data received by the HUE to the TUE.

If cooperation between UEs is performed by D2D communication, the eNB may allocate a resource for D2D communication and notify each UE of the resource. For example, if cooperation between UEs is performed in a resource for UL/DL transmission and reception with the eNB (e.g., D2D communication is performed on a UL resource), the eNB may signal a resource (e.g., subframe set and frequency resource allocation) for cooperation between UEs to each UE.

On the other hand, if cooperation between UEs is performed through a separate network or a separate resource separately from eNB communication (e.g., NFC, WiFi, . . . ), the eNB may not signal a resource for cooperation between UEs, or may allocate a time domain resource only to assure a UE cooperative time.

Figure 13:
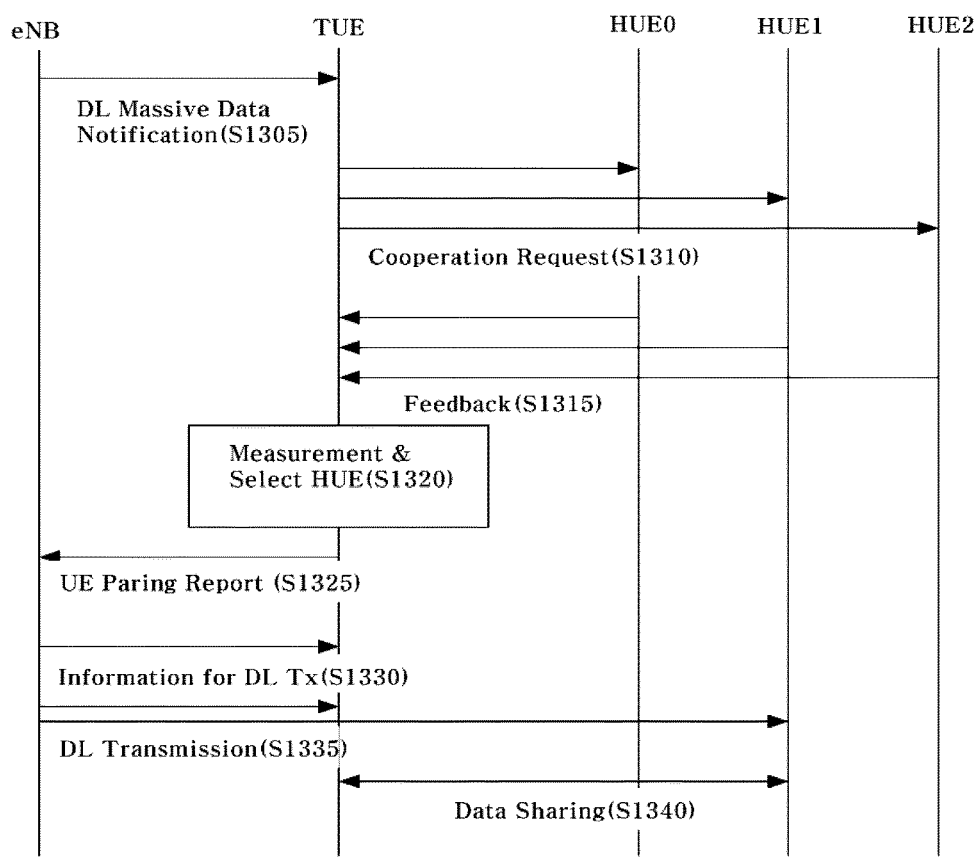
FIG. 13 illustrates a flow of a method for transmitting and receiving a downlink signal according to one embodiment of the present invention.
Figure 14:
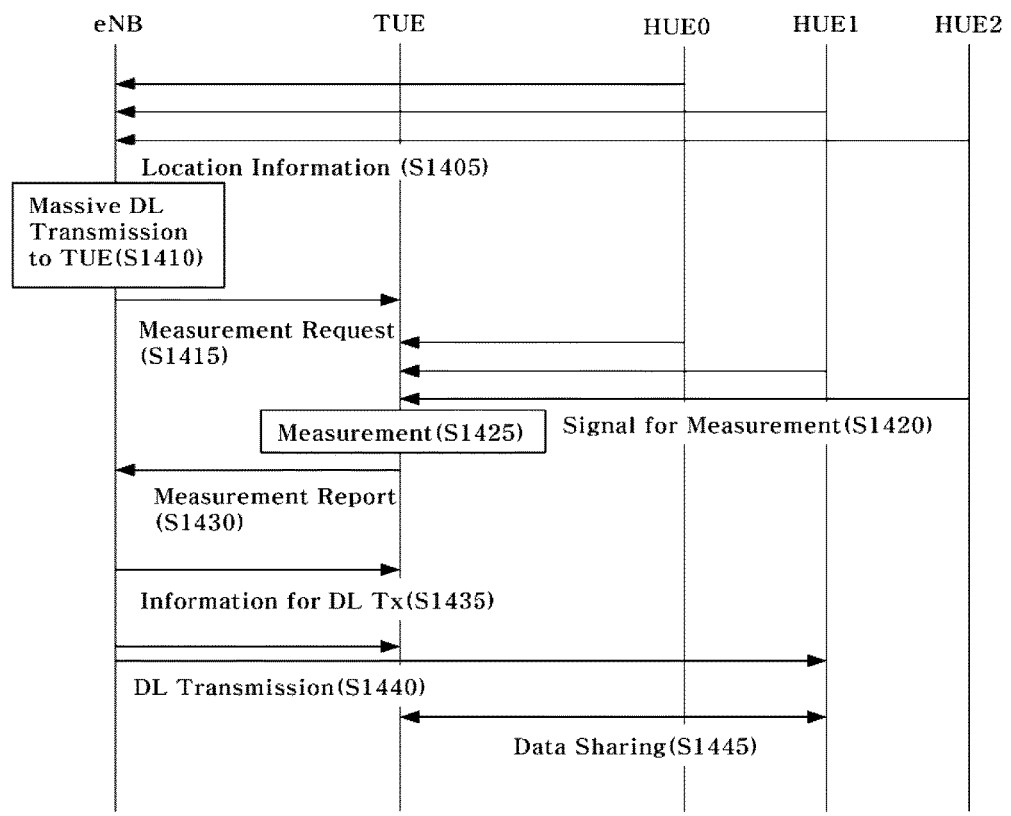
FIG. 14 illustrates a flow of a method for transmitting and receiving a downlink signal according to another embodiment of the present invention.

FIGS. 13 and 14 illustrate UE cooperative operation according to one embodiment of the present invention.

In FIGS. 13 and 14, it is assumed that the eNB has DL massive data which will be transmitted to the TUE. The massive data means data having a size of a certain level or more, and may be data that cannot be received by the TUE at one time. For example, although the eNB may transmit the massive data at one time, since the number of antennas of the TUE is not sufficient, the TUE may not receive the massive data at one time. In this case, the eNB transmits the massive data to the TUE and the HUE divisionally based on UE cooperation without transmitting the massive data to the TUE through scheduling of once.

Since the eNB may perform transmission to the TUE and transmission to the HUE at the same time, even there is a UE which is not sufficient to receive data, whole system throughput may be maintained uniformly in view of the eNB.

Referring to FIG. 13, the eNB notifies the TUE that DL massive data have occurred (S1305).

The TUE requests neighboring HUE candidates (HUE 0, HUE1 and HUE2) of a cooperation to receive massive data (S1310).

The TUE receives feedback signals from the HUE candidates (S1315).

The TUE measures the feedback signal from the HUE candidates and selects the HUE based on the measured result (S1320). For convenience, it is assumed that the HUE1 has been selected.

The TUE reports UE pairing to the eNB (S1325). For example, the TUE reports information (e.g., UE ID or priority) on the HUE 1 to the eNB.

The eNB transmits DL transmission information to the TUE (S1330). For example, the eNB may provide the TUE with information on a unit or resource for transmission of DL data to the TUE and the HUE.

The eNB transmits data to the TUE and the HUE0 divisionally (S1335). Data transmission to the TUE and data transmission to the HUE0 may be performed at the same time.

Afterwards, the HUE0 transmits data for the TUE, which is received from the eNB, to the TUE (S1340).

Next, the UE cooperation operation of FIG. 14 will be described. The repeated description of FIG. 13 will be omitted.

First of all, the HUE candidates transmit their location information to the eNB (S1405).

Afterwards, if DL massive data which will be transmitted to the TUE occur (S1410), the eNB requests the TUE of measurement report (S1415). The request of measurement report is to request the TUE to measure the HUE candidates for a UE cooperative operation, and may include, but not limited to, information on HUE candidates which are measurement targets.

The TUE receives a signal for measurement from the HUE candidates (S1420), and measures the received signal (S1425).

The TUE transmits a measurement report to the eNB (S1430). The measurement report includes a measurement result for the HUE 1, and it is assumed that the HUE 1 of the HUE candidates has the most excellent measurement result.

The eNB transmits DL transmission information to the TUE (S1435). For example, the eNB may provide the TUE with information on a unit or resource for transmission of DL data to the TUE and the HUE.

The eNB transmits data to the TUE and the HUE1 divisionally (S1440). Data transmission to the TUE and data transmission to the HUE1 may be performed at the same time.

Afterwards, the HUE1 transmits data for the TUE, which is received from the eNB, to the TUE (S1445).

Suggestion 2

According to the suggestion 2, a method for increasing $N_{Rx\_UE}$ in the Equation 21 is considered.

Figure 15:
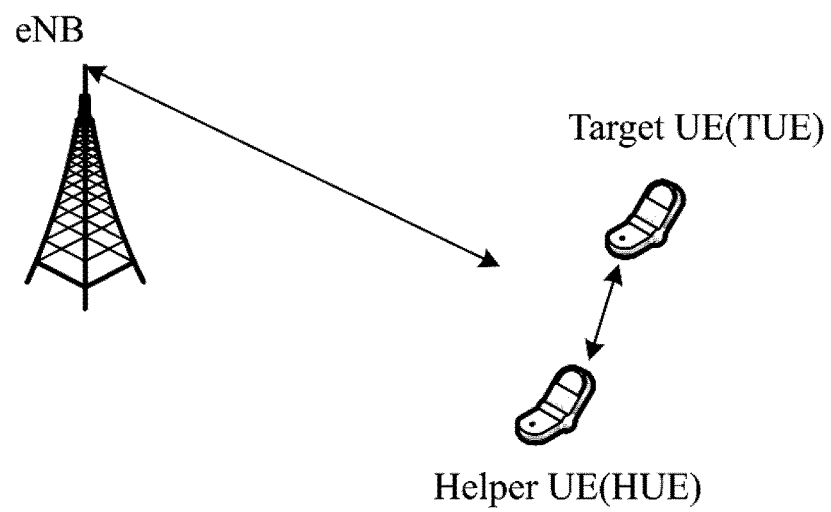
FIG. 15 is a view illustrating UE cooperation according to another embodiment of the present invention.

Referring to FIG. 15, a UE pair comprised of TUE and HUE to increase $N_{Rx\_UE}$ is regarded as one UE (e.g., virtual UE). The eNB regards the corresponding UE pair as one UE and transmits data which should be transmitted to the TUE to the UE pair. That is, if each UE has two Rx antennas, the eNB may transmit and receive data for the TUE by regarding the UE pair as one UE having 4 Rx antennas.

In this suggestion, it is assumed that complexity increase caused by increase of the Rx antennas may be processed within the UE pair. For example, although the TUE has two Rx antennas, it may be assumed that a processor of the TUE has a data processing capability for 4 Rx antennas.

If the method of FIG. 15 is used, since Rx antennas more than Rx antennas owned by the TUE are used for data reception, DoF is increased, and the eNB may transmit more data to the TUE through the UE pair.

The following matters for the aforementioned operation should be considered.

(1) HUE Selection

The HUE may be selected equally to the method of the suggestion 1.

However, unlike the suggestion 1, since stability of a link between UEs is more important in the suggestion 2 than the suggestion 1, the TUE (e.g., UE pair configuration through a link using a cable) constituting a pair with the HUE in advance may request the eNB of an operation for UE cooperation in the suggestion 2.

(2) Virtual UE ID

As described above, since a plurality of UEs may be regarded as one UE in the suggestion 2, UE ID for a virtual UE may be allocated additionally.

Alternatively, although ID of the TUE is used as UE ID for a UE pair, attributes of the UE may be changed. For example, UE ID is maintained but the number of Rx antennas, a transport block (TB) size that can be processed, and a transmission mode (TM) may be configured differently per time unit.

Virtual UE ID may be allocated by a request of the TUE. Alternatively, if UE pairing is performed by the eNB, virtual UE ID may be signaled to the UE pair by the eNB even without request of the UE.

The TUE may report a UE category of the virtual UE to the eNB. The UE category may include data capacity that can be processed based on the specifications which are defined in advance. Additionally, the UE category may include information on the number of Rx antennas of the virtual UE. In this case, the number of Rx antennas may be smaller than or equal to a sum of the number of Rx antennas of UEs constituting a pair. Also, the number of Rx antennas of the virtual UE may be determined in accordance with a data processing capability. For example, even though the number of Rx antennas within the UE pair is actually 8, if data can be processed for maximum 6 Rx antennas within the UE pair, the number of Rx antennas of the virtual UE may be reported as 6.

The eNB may determine an MCS of data transmitted to the UE pair, antenna ports and/or a transmission scheme based on the virtual UE category.

(3) Resource Allocation

In FIG. 15, if the HUE receives data (hereinafter, VUE data), which will be forwarded to the TUE, and its data (hereinafter, HUE data) from the eNB, the eNB may divisionally allocate a resource for operating the HUE as a single UE and a resource for operating the HUE as a virtual HUE.

If the operation of the HUE serves to simply forward data received for the TUE to the TUE (that is, if the HUE forwards the received signal to the TUE as it is), a resource for HUE data and a resource for VUE data may be allocated at the same subframe.

Therefore, the eNB may signal information (e.g., layer classification per target, antenna classification, time/frequency resource classification, etc.) on allocation of the resource for HUE data and the resource for VUE data to the HUE within the same subframe. For example, each resource may be classified in a unit of RB (set), or may be classified in a unit of OFDM symbol.

In the UE cooperative operation, the HUE may serve as a part of a VUE data demodulation procedure. In this case, since the HUE should process the VUE data, it may be preferable that the HUE data and the VUE data are separated from each other. Therefore, it is preferable the resource of HUE data and the resource of VUE data are mapped into their respective subframes different from each other. To this end, the eNB may signal different subframe sets to the TUE/HUE in accordance with data which becomes a transmission target.

Meanwhile, the role of the HUE during UE cooperation may be reported to the eNB. For example, the TUE (or HUE) may report the role of the HUE during UE cooperation to the eNB. This report may indicate whether the eNB should separate the HUE data from the VUE data for UE cooperation during resource allocation for the HUE in a time (and/or frequency) domain.

Figure 16:
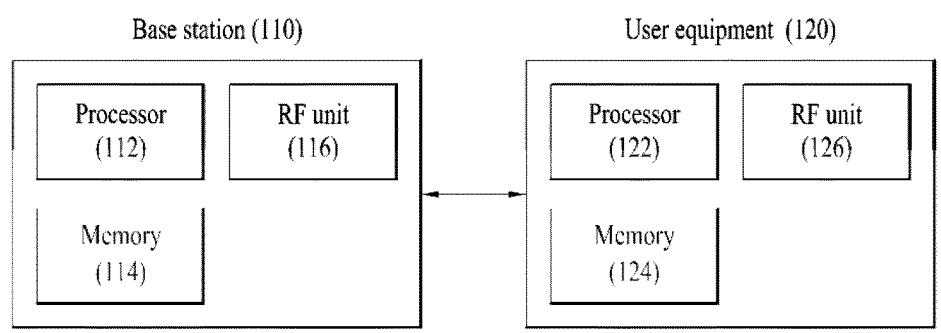
FIG. 16 illustrates a UE and an eNB according to one embodiment of the present invention.

FIG. 16 illustrates an eNB and a UE that may be applied to the embodiment of the present invention. The eNB and the UE shown in FIG. 16 may perform the signal transmission and reception operation according to the aforementioned embodiments.

Referring to FIG. 16, a wireless communication system includes an eNB (or BS) 110 and a UE 120. On a downlink, a transmitter is a part of the eNB 110 and a receiver is a part of the UE 120. On an uplink, a transmitter is a part of the UE 120 and a receiver is a part of the eNB 110. The eNB 110 includes a processor 112, a memory 114, and a radio frequency (RF) unit 116. The processor 112 may be configured to implement procedures and/or methods suggested in the present invention. The memory 114 is connected with the processor 112 and stores various kinds of information related to the operation of the processor 112. The RF unit 116 is connected with the processor 112 and transmits and/or receives a radio signal. The UE 120 includes a processor 122, a memory 124, and a radio frequency (RF) unit 126. The processor 122 may be configured to implement procedures and/or methods suggested in the present invention. The memory 124 is connected with the processor 122 and stores various kinds of information related to the operation of the processor 122. The RF unit 126 is connected with the processor 122 and transmits and/or receives a radio signal. The eNB 110 and/or the UE 120 may have a single antenna or multiple antennas.

According to one embodiment of the present invention, the eNB 110 transmits at least a part of downlink data to a first UE (e.g., TUE). If a size of the downlink data exceeds a data reception capability of the first UE, the eNB transmits the other part of the downlink data of the first UE to a second UE (e.g., HUE) paired with the first UE. Transmission for the first UE and transmission for the second UE may be performed at the same time. Also, the other part of the downlink data of the first UE, which are transmitted to the second UE, may be shared with the first UE through direct communication between UEs.

Also, the eNB may transmit information on relation between at least a part of the downlink data transmitted to the first UE and the other part of the downlink data of the first UE, which are transmitted to the second UE, to the first UE. The information on relation may include a segment unit (e.g., codeword) of the downlink data of the first UE and an index (e.g., index of codeword) of segment data transmitted to each of the first UE and the second UE.

Also, the eNB may allocate a time resource for performing direct communication between UEs to the first UE or the second UE.

Also, if a size of the downlink data of the first UE exceeds a data reception capability of the first UE, the eNB may request the first UE to measure neighboring UEs to select the second UE. The eNB may receive a measurement report that includes at least one of ID of the second UE selected from the neighboring UEs and preference (e.g., priority) of the first UE for the second UE from the first UE.

The data reception capability of the first UE may be determined based on the number of Rx antennas of the first UE.

According to one embodiment of the present invention, the UE 120 may be operated as a first UE (i.e., TUE) or a second UE (i.e., HUE). The case where the UE 120 is operated as the first UE will be described. If a size of downlink data which will be received by the first UE exceeds a data reception capability of the first UE, the first UE reports information on the second UE paired with the first UE to the eNB. The first UE receives at least a part of the downlink data of the first UE from the eNB. The first UE receives the other part of the downlink data of the first UE from the second UE through direct communication between UEs. The first UE may merge at least a part of the downlink data received from the eNB with the other part of the downlink data received from the second UE.

Also, the first UE may receive information on relation between at least a part of the downlink data transmitted to the first UE and the other part of the downlink data of the first UE, which are transmitted to the second UE, from the eNB. The information on relation may include a segment unit of the downlink data of the first UE and an index of segment data transmitted to each of the first UE and the second UE.

Also, the first UE may be allocated with a time resource for performing direct communication between UEs from the eNB.

Also, if the size of the downlink data of the first UE exceeds a data reception capability of the first UE, the first UE may measure neighboring UEs to select the second UE. The first UE may transmit a measurement report that includes at least one of ID of the second UE selected from the neighboring UEs and preference of the first UE for the second UE to the eNB.

It will be appreciated by persons skilled in the art that the objects that can be achieved by the present invention are not limited to what has been particularly described hereinabove and the above and other objects that the present invention can achieve will be more clearly understood from the foregoing detailed description taken in conjunction with the accompanying drawings. The exemplary embodiments described hereinabove are combinations of elements and features of the present invention. The elements or features may be considered selective unless otherwise mentioned. Each element or feature may be practiced without being combined with other elements or features. Further, the embodiments of the present invention may be constructed by combining parts of the elements and/or features. Operation orders described in the embodiments of the present invention may be rearranged. Some constructions or characteristics of any one embodiment may be included in another embodiment and may be replaced with corresponding constructions or characteristics of another embodiment. It is apparent that the present invention may be embodied by a combination of claims which do not have an explicitly cited relation in the appended claims or may include new claims by amendment after application.

In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', etc.

The above-described embodiments of the present invention can be implemented by a variety of means, for example, hardware, firmware, software, or a combination thereof. In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. Software code may be stored in a memory to be driven by a processor. The memory may be located inside or outside of the processor, so that it can communicate with the aforementioned processor via a variety of well-known parts.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

As described above, the embodiments of the present invention may be applied to various wireless communication systems including a 3GPP based wireless communication system.

What is claimed is:

1. A method for transmitting a downlink signal by a base station in a wireless communication system, the method comprising:

transmitting, to a first user equipment (UE), a massive data notification, when a size of first UE-specific downlink data exceeds a data reception capability of the first UE;

receiving, from the first UE, UE pairing information for reporting that the first UE is paired with a second UE in response to the massive data notification;

allocating a virtual UE ID to a pair of the first UE and the second UE;

transmitting, using the virtual UE ID, at least a part of the first UE-specific downlink data to the first UE; and transmitting, using the virtual UE ID, the other part of the first UE-specific downlink data to the second UE that is paired with the first UE, wherein transmission for the first UE and transmission for the second UE are performed at a same time, and the other part of the first UE-specific downlink data which has been transmitted to the second UE, is shared with the first UE through direct communication between the first UE and the second UE.

2. The method according to claim 1, further comprising:

transmitting, to the first UE, information on relation between the at least a part of the first UE-specific downlink data transmitted to the first UE and the other part of the first UE-specific downlink data transmitted to the second UE.

3. The method according to claim 2, wherein the information on relation includes a segment unit of the first UE-specific downlink data and an index of each segment data transmitted to each of the first UE and the second UE.

4. The method according to claim 1, further comprising:

allocating, to the first UE or the second UE, a time resource for performing the direct communication between the first UE and the second UE.

5. The method according to claim 1, further comprising:

requesting the first UE to measure neighboring UEs for selecting the second UE if the size of the first UE-specific downlink data exceeds the data reception capability of the first UE; and receiving, from the first UE, a measurement report that includes at least one of ID of the second UE selected from the neighboring UEs and preference of the first UE for the second UE.

6. The method according to claim 1, wherein the data reception capability of the first UE is determined based on a number of receiving antennas of the first UE.

7. A base station for transmitting a downlink signal in a wireless communication system, the base station comprising:

a transmitter;

a receiver; and a processor that:

controls the transmitter to transmit, to a first user equipment (UE), a massive data notification, when a size of first UE-specific downlink data exceeds a data reception capability of the first UE, controls the receiver to receive, from the first UE, UE pairing information for reporting that the first UE is paired with a second UE in response to the massive data notification, allocates a virtual UE ID to a pair of the first UE and the second UE, and controls the transmitter to transmit, using the virtual UE ID, at least a part of the first UE-specific downlink data to the first UE and to transmit the other part of the first UE-specific downlink data to the second UE, wherein transmission for the first UE and transmission for the second UE are performed at a same time, and the other part of the first UE-specific downlink data which has been transmitted to the second UE, is shared with the first UE through direct communication between the first UE and the second UE.

8. A method for receiving a downlink signal in a first user equipment (UE) in a wireless communication system, the method comprising:
- receiving, from a base station, a massive data notification, when a size of first UE-specific downlink data exceeds a data reception capability of the first UE;
- transmitting, to the base station, UE pairing information for reporting that the first UE is paired with a second UE in response to the massive data notification;
- receiving, from the base station, information for allocating a virtual UE ID to a pair of the first UE and the second UE;
- receiving, using the virtual UE ID, at least a part of the first UE-specific downlink data from the base station;
- receiving the other part of the first UE-specific downlink data from the second UE through direct communication between the first UE and the second UE; and
- merging the at least a part of the downlink data received from the base station with the other part of the downlink data received from the second UE.

9. The method according to claim 8, further comprising:
receiving, from the base station, information on relation between the at least a part of the first UE-specific downlink data transmitted to the first UE and the other part of the first UE-specific downlink data transmitted to the second UE.

10. The method according to claim 9, wherein the information on relation includes a segment unit of the first UE-specific downlink data and an index of each segment data transmitted to each of the first UE and the second UE.

11. The method according to claim 9, further comprising:
receiving, from the base station, a time resource allocation for performing the direct communication between the first UE and the second UE.

12. The method according to claim 9, further comprising:
- measuring neighboring UEs for selecting the second UE if the size of the first UE-specific downlink data of the first UE exceeds the data reception capability of the first UE; and
- transmitting, to the base station, a measurement report that includes at least one of ID of the second UE selected from the neighboring UEs and preference of the first UE for the second UE.

13. The method according to claim 9, wherein the data reception capability of the first UE is determined based on a number of receiving antennas of the first UE.

14. The method according to claim 9, wherein transmission of the base station for the first UE and transmission of the base station for the second UE are performed at a same time.

* * * * *